US008467140B2

(12) United States Patent
Sakai et al.

(10) Patent No.: US 8,467,140 B2
(45) Date of Patent: Jun. 18, 2013

(54) MAGNETIC RECORDING APPARATUS AND MAGNETIC RECORDING EVALUATING APPARATUS

(75) Inventors: Toshihiko Sakai, Osaka (JP); Masaki Yamamoto, Osaka (JP); Yasuhiro Harada, Osaka (JP); Go Mori, Osaka (JP); Hideharu Tajima, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 491 days.

(21) Appl. No.: 12/802,622

(22) Filed: Jun. 10, 2010

(65) Prior Publication Data
US 2010/0328800 A1 Dec. 30, 2010

(30) Foreign Application Priority Data

Jun. 25, 2009 (JP) ................................. 2009-150426
Oct. 2, 2009 (JP) ................................. 2009-230684

(51) Int. Cl.
*G11B 27/36* (2006.01)
*G11B 5/09* (2006.01)

(52) U.S. Cl.
USPC ............................................ 360/31; 360/48

(58) Field of Classification Search
None
See application file for complete search history.

(56) References Cited

U.S. PATENT DOCUMENTS

2006/0024529 A1 2/2006 Murakami
2006/0119965 A1 6/2006 Ohno

FOREIGN PATENT DOCUMENTS

| JP | 2000-235770 A | 8/2000 |
| JP | 2003-281701 A | 10/2003 |
| JP | 2006-073175 A | 3/2006 |
| JP | 2006-164349 A | 6/2006 |

*Primary Examiner* — Regina N Holder
(74) *Attorney, Agent, or Firm* — Edwards Wildman Palmer LLP; David G. Conlin; David A. Tucker

(57) ABSTRACT

A magnetic recording apparatus includes: a magnetic recording medium having a recording surface on which a plurality of magnetic recording cells magnetically isolated from each other are arranged; a magnetic writing element recording information to the magnetic recording cells under a condition in accordance with setting information; a magnetic reading element reproducing information recorded in the magnetic recording cells; a memory storing the setting information for writing; and a processor for executing a program code. The program code includes a test module, responsive to a test write start signal, for repeating writing and reading test information by the magnetic writing and reading elements and calculating a quality index value representing quality of writing of the reproduced test information with the setting information changed, and a write module for selecting setting information with which the quality index value satisfies a predetermined condition, and writing the selected information in the memory.

20 Claims, 16 Drawing Sheets

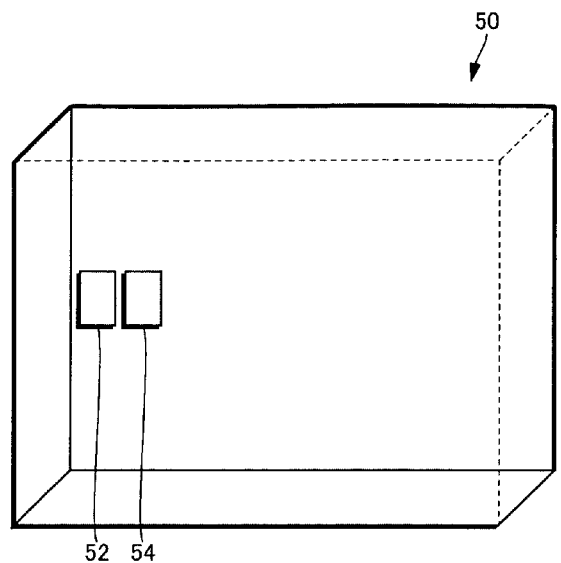
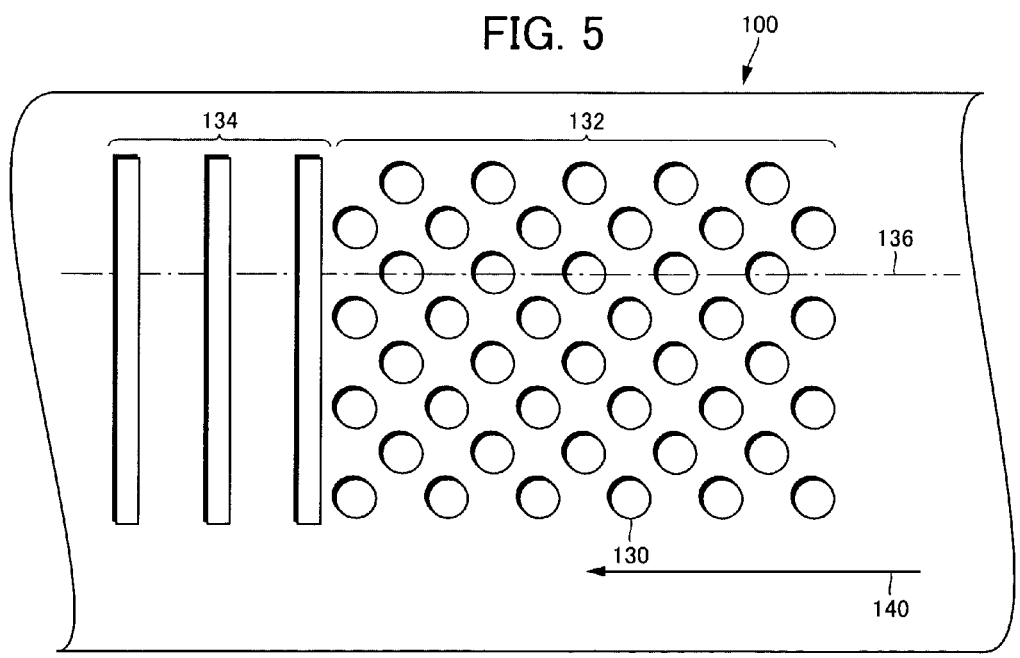

MAGNETIC RECORDING APPARATUS AND MAGNETIC RECORDING EVALUATING APPARATUS

CROSS-REFERENCE TO RELATED APPLICATION

This nonprovisional application claims priority under 35 U.S.C. §119(a) on Patent Application Nos. 2009-150426 and 2009-230684 filed in Japan on Jun. 25, 2009 and Oct. 2, 2009, respectively, the entire contents of which are hereby incorporated by reference.

BACKGROUND OF THE INVENTION

1. Field of the Invention

The present invention relates to a magnetic recording apparatus recording data on a recording medium and, more specifically, to a magnetic recording apparatus using a recording medium allowing high-density recording.

2. Description of the Background Art

Information equipment such as personal computers comes to have remarkably improved functions and, as a result, users are handling ever increasing amount of information. Naturally, there is a strong demand among users for a large capacity storage allowing storage of larger amount of data.

An example of a large capacity storage is a recording apparatus using a hard disk. A hard disk is formed by applying a magnetic substance on a disk-shaped substrate. A hard disk stores information by magnetizing a magnetic layer on the disk surface using a magnetic head.

To realize a storage of larger capacity, the challenge is to improve recording density of a hard disk as the recording medium. In the conventional hard disk described above, in the magnetic layer formed uniformly and continuously on the medium surface, a recording mark as a unit of data writing has a serrated edge. The serrated shape causes noise (transition noise) at the time of reproduction, which noise lowers S/N ratio (Signal to Noise Ratio), leading to a problem that the recorded information cannot be correctly reproduced.

In order to improve recording density, it is also necessary to reduce the size of recording mark itself. In a conventional hard disk, recording marks are formed on a uniformly formed magnetic layer and, therefore, when the marks are made smaller to increase density, magnetism interference occurs between recording marks. As a result, correct recording of information becomes difficult, or correct reproduction of recorded information becomes difficult.

A solution to such problems is "patterned medium." The patterned medium refers to a magnetic recording medium having an array of magnetically isolated magnetic recording cells. The magnetic recording cell consists of particles of magnetic material arranged regularly at a constant interval in a non-magnetic material. The magnetic recording cell stores a piece of magnetic information, and the edge of recording mark is the edge of magnetic recording cell. As a result, when patterned medium is used as the recording medium, the noise at the time of reproduction and the magnetic interference between recording marks can be reduced, whereby the recording density can significantly be improved.

In the patterned medium, magnetic field is generated in accordance with the magnetic recording cells formed in advance, to record information. Therefore, it is necessary to adjust timings and to generate electric field with high accuracy with respect to the magnetic recording cells.

Japanese Patent Laying-Open No. 2003-281701 (hereinafter referred to as "'701 Reference") discloses a magnetic recording medium using patterned medium, in which the timing for generating magnetic field is adjusted by detecting leakage magnetic field at the time of recording. According to the technique disclosed in '701 Reference, utilizing the fact that the leakage magnetic field when a magnetic writing element is on a magnetic recording cell of the media is different from the leakage magnetic field when the element is not on the magnetic recording portion, the timing is adjusted such that the magnetic writing element generates magnetic field on a magnetic recording cell on the media.

The pitch between magnetic recording cells formed on a high-density magnetic recording medium such as the patterned medium is as narrow as several nm. Therefore, even a slight deviation between the position of magnetic writing element of a recording/reproducing head for recording and the position of a desired magnetic recording cell easily leads to a recording error. Therefore, generation of electric field at the optimal timing is essential in the magnetic recording apparatus using patterned medium.

When the magnetic recording apparatus controls positioning of the magnetic writing element with respect to the magnetic recording medium, typically required positioning accuracy of the magnetic writing element in the circumferential direction of magnetic recording medium is at most 10% of the pitch between magnetic recording cells, that is, at most a few nm. Considering the surface recording density of about 1 terra byte (Tb)/in$^2$, the accuracy of about 1 nm is required. Since the magnetic recording medium moves relative to the magnetic writing element, positioning control of the magnetic writing element equivalently means timing control of magnetic field generation. If the linear velocity to the circumferential direction of magnetic recording medium is several m/s, timing control of about several ps is required.

According to the technique of '701 Reference, the magnetic field detecting element detects, together with the leakage magnetic field from the magnetic field generating element, the magnetic field recorded on the medium. Therefore, it has been necessary to separate a signal for timing adjustment. Depending on the distance between the magnetic field generating element and the magnetic field detecting element, a peak of magnetic signal from the medium and a peak of leakage magnetic field signal may be detected substantially at the same time, making signal separation difficult. Further, the leakage magnetic field signal tends to be smaller than a signal from the medium and, therefore, detection error may possibly be caused by only a slight noise at the time of detection. Further, variation among individual media makes it difficult to uniformly control timings.

SUMMARY OF THE INVENTION

Therefore, it is preferable to provide a magnetic recording apparatus using patterned medium as the recording medium enabling reduction of recording and reproduction errors.

There is also a demand for a magnetic recording evaluating apparatus that can measure characteristics of a recording medium used in a magnetic recording apparatus using patterned medium as the recording medium, for reducing recording and reproduction errors.

According to a first aspect, the present invention provides a magnetic recording apparatus, including: a magnetic recording medium having a recording surface on which a plurality of magnetic recording cells magnetically isolated from each other are arranged; a magnetic writing element generating magnetic field in accordance with write information under a condition in accordance with prescribed setting information while moving relative to the recording surface, thereby to record information in the magnetic recording cells of the magnetic recording medium; a magnetic reading element reproducing information recorded in the magnetic recording cells of the magnetic recording medium while moving with the magnetic writing element relative to the recording surface; a first memory storing the prescribed setting information for writing of information by the magnetic writing element; and a processor connected to the first memory, the magnetic writing element and the magnetic reading element, for executing a program code. The program code includes a test module, responsive to a test write start signal, for repeating writing and reproduction of test information by the magnetic writing element and the magnetic reading element and calculating a prescribed quality index value representing quality of writing of the reproduced test information with the prescribed setting information changed, and a first write module for selecting setting information with which the prescribed quality index value satisfies a predetermined condition based on the prescribed quality index value calculated by the test module, and writing the selected information in the first memory.

The magnetic writing element generates magnetic field in accordance with the write information under conditions defined by prescribed setting information while it moves relative to the recording surface, and records information on the recording cells on the magnetic recording medium. The magnetic reading element reads information recorded on the magnetic recording cells on the magnetic recording medium while it moves relative to the recording surface as does the magnetic writing element. The first memory stores the prescribed setting information for writing of information by the magnetic writing element. The test write module repeats writing and reproduction of test information by the magnetic writing element and the magnetic reading element and calculation of quality index value representing the quality of writing of reproduced test information, with the prescribed setting information varied, in response to the test write start signal. Based on the result, the first write module selects the piece of setting information with which the prescribed quality index value satisfies predetermined conditions.

In the magnetic recording apparatus, while the prescribed setting information related to the magnetic writing element is varied, writing and reproduction of test information to the magnetic recording medium and calculation of quality index value indicating the quality of writing of the test information are repeated, on the magnetic recording medium. Optimal prescribed setting information by which the quality index value satisfies predetermined conditions is selected, and information is written using the setting information. Therefore, in the magnetic recording apparatus using the patterned medium in which timing of writing to the medium is of critical importance, it becomes possible to write information to the magnetic recording medium using optimal setting information of the magnetic writing element. As a result, a magnetic recording apparatus using a patterned medium as the recording medium enabling reduction of recording and reproduction errors can be provided.

Preferably, in the magnetic recording apparatus, the program code further includes a determining module for determining whether or not an output signal of the magnetic reading element matches a prescribed signal serving as a trigger of writing by the magnetic writing element. The prescribed setting information includes a standby time period from determination by the determining module that the output signal matches the prescribed signal until generation of magnetic field by the magnetic writing element.

In the magnetic recording apparatus, whether or not the output signal from the magnetic writing element matches a prescribed signal is determined, and the standby time period from when the output signal from the magnetic recording medium matched the prescribed signal until the magnetic writing element generates magnetic field is adjusted. Since the standby time period from the detection by the magnetic reading element of a prescribed signal as a trigger for writing by the writing element until generation of magnetic field is adjusted, the positional relation between the magnetic writing element and the magnetic recording cell on the magnetic recording medium at the time of writing information by the magnetic writing element can be adjusted.

Preferably, the test module includes: a standby time period changing module, responsive to the test write start signal for changing stepwise the standby time period for a predetermined prescribed range of change having upper and lower limits; a second write module causing the magnetic writing element to start generation of magnetism in accordance with the test information and thereby to write the test information in the magnetic recording medium, for each standby time period changed by the standby time period changing module, using as a reference a time point when the standby time period has passed from when the prescribed signal is output from the magnetic reading element; a read module causing the magnetic reading element to reproduce the test information written by the second write module to the magnetic recording medium, for each standby time period changed by the standby time period changing module; an index value calculating module for calculating the quality index value by comparing the test information written by the second write module and the test information reproduced by the magnetic reading element, for each standby time period changed by the standby time period changing module; a quality information memory storing the quality index value calculated by the index value calculating module and corresponding standby time period; and a writing device for storing, in the first memory, the standby time period stored in the quality information memory in association with that one of the quality index values stored in the quality information memory which satisfies the predetermined condition.

The standby time period changing module changes stepwise the standby time period for a predetermined, prescribed range with upper and lower limits, in response to a test write start signal. The second write module writes, for every standby time period changed by the standby time period changing module, the test information to the magnetic recording medium, by causing the magnetic writing element to start generation of magnetism in accordance with the test information, using as a reference a time point when the corresponding standby time period passed after the output of prescribed signal from the magnetic reading element. The test module causes the magnetic reading element to read the test information written by the second write module to the magnetic recording medium, for every standby time period changed by the standby time period changing module. The index value calculating module calculates, for every standby time period changed by the standby time period changing module, the quality index value by comparing the test information written by the second write module and the test information read by the test module. The quality information memory stores the quality index value calculated by the index value calculating module and the corresponding standby time period in association with each other. The writing device selects the standby time period stored in the quality information memory in association with that quality index value stored in the quality information memory which satisfied the predetermined condition, and has the selected period stored in the first memory.

In the magnetic recording apparatus, in the test write module, the test information is written and reproduced and the quality index value of reproduced test information is calculated while the standby time period is changed stepwise over a prescribed range. Then, the standby time period and the quality index value corresponding to each standby time period are stored in association with each other, and the standby time period corresponding to the stored quality index value satisfying predetermined conditions is selected and stored in the first memory. By such an approach, it becomes possible to find the optimal standby time period for each magnetic recording medium.

Preferably, the predetermined condition is that the quality index value is the best.

More preferably, the magnetic recording medium has a disk-shape; the magnetic recording cells are arranged on the recording surface, with a pitch d in circumferential direction of the disk shape; and with design velocity of relative movement of the recording surface to the magnetic writing element and the magnetic reading element being liner velocity v, width of the prescribed range of change is selected to be larger than d/v.

In the magnetic recording apparatus, the standby time period corresponding to the best quality index value is stored in the first memory. As a result, it becomes possible to record information on the magnetic recording medium to attain the best signal quality value. Further, when the magnetic recording medium has the structure and design as described above, the relation between the calculated quality index value and the standby time period is represented by a periodical graph of d/v. Therefore, if the predetermined condition is that the quality index value is the best, the best quality index value can reliably be detected by setting the width of prescribed range changed by the test module to be larger than d/v.

Preferably, the index value calculating module includes an error rate calculating module for calculating error rate of the read test information to the written test information, by comparing the test information written by the second write module and the test information read by the read module, for each standby time period changed by the standby time period changing module.

Preferably, the index value calculating module includes a jitter calculating module for calculating jitter of a read signal, by comparing a signal waveform read and output by the read module with a prescribed reference signal, for each standby time period changed by the standby time period changing module.

More preferably, the predetermined condition is that the quality index value is not higher than a predetermined defined value.

The smaller error rate and the smaller jitter represent higher signal quality. If the condition that the quality index value is not larger than a predetermined defined value is satisfied, the standby time period attaining good writing quality can be found from the quality index value satisfying the condition.

More preferably, the predetermined condition is that the quality index value is a value corresponding to the standby period of $(t_b+t_a)/2$, where $t_a$ represents the delay time when the quality index value, calculated corresponding to the changed standby time period, first assumes a value not larger than a predetermined defined value, from a value larger than the defined value, while the standby time period changing module changes stepwise the delay time from the lower limit to the upper limit of the prescribed range of change, and $t_b$ represents the delay time, larger than $t_a$, when the quality index value first assumes a value not smaller than the defined value, from a value smaller than the defined value.

More preferably, the magnetic recording medium has a disk-shape; the magnetic recording cells are arranged on the recording surface, with a pitch d in circumferential direction of the disk shape; and with design velocity of relative movement of the recording surface to the magnetic writing element and the magnetic reading element being liner velocity v, width of the prescribed range of change is selected to be larger than 2 d/v.

In the range of standby time period when the quality index value assumes a value not higher than the predetermined defined value, the standby time period is determined to satisfy the condition that it corresponds to the central time of the time range. When writing is done using the standby time period determined in this manner, the quality index value is highly likely kept in a constant range even if write timing deviates because of the influence of noise or the like. Further, when the magnetic recording medium has the structure and design as described above, the relation between the calculated quality index value and the standby time period is represented by a periodical graph of d/v. Therefore, if the predetermined condition is as above, the quality index value that satisfies the condition can reliably be detected by setting the prescribed set range changed by the test write module to be larger than 2 d/v.

Preferably, the magnetic recording medium includes a servo pattern area having a prescribed servo pattern written in advance, and a user data area allowing data writing by the magnetic writing element.

More preferably, the magnetic recording medium has a disk-shape; the magnetic writing element and the magnetic reading element are arranged spaced by a distance L in the circumferential direction of the disk shape; and with design velocity of relative movement of the recording surface to the magnetic writing element and the magnetic reading element being liner velocity v, the lower limit value is selected to be larger than L/v.

When the magnetic recording medium has the structure and design as described above and the magnetic writing element and the magnetic reading element satisfy the above-described conditions, it takes L/v for the cell read by the magnetic reading element to pass through the magnetic writing element. Therefore, if a signal is read in the servo pattern area and a signal is to be written on a user data area following the servo pattern area, it is possible to cause the magnetic writing element to reliably generate the magnetic field on the user data area by selecting the lower limit value to be larger than L/v.

Preferably, the magnetic recording medium includes a user data area allowing data writing by the magnetic writing element, and the user data area stores information for the magnetic reading element to output the prescribed signal serving as a trigger for writing by the magnetic writing element.

The magnetic recording medium includes, in the user data area allowing writing by the user, information for outputting a prescribed signal as a trigger of writing by the magnetic writing element. As the information for outputting the prescribed signal is included in the user area, it becomes unnecessary to ensure an area dedicated for holding the information on the magnetic recording medium. Therefore, a magnetic recording medium having large capacity can be realized. Further, since the magnetic recording medium includes information for outputting the prescribed signal, it is possible to optimize the prescribed setting information by the test write module and, therefore, in a magnetic recording apparatus using the magnetic recording medium of larger capacity, occurrence of recording error at the time of recording and reproduction can be reduced.

Preferably, the magnetic recording apparatus further includes a timer for measuring elapse time from when the standby time period selected by the first write module is stored in the first memory and, when a prescribed set time is reached, generating and applying to the processor the test write start signal.

Since the processor executes test writing at every prescribed period, it is possible to provide optimal prescribed setting information for an aged magnetic recording medium.

Preferably, the magnetic recording apparatus further includes a recording state value calculating module for calculating a recording state value indicating quality of information writing by the magnetic writing element in a normal operation other than when the processor is operating, and the processor is activated in responses to the recording state value calculated by the recording state value calculating module attaining to a prescribed reference value or lower.

The magnetic recording apparatus calculates the quality of information writing by the magnetic writing element in a normal operation, and in response to the value attaining a prescribed reference value or lower, operates the test write module. Since the test write module operates when the write quality deteriorates to be lower than the reference value, it is possible to optimize the prescribed setting information and to maintain the signal quality at a constant level or higher at the time of recording.

Preferably, the magnetic recording medium includes a test write area ensured in advance as an area to be used when the processor operates, and an area allowing writing of information by the magnetic writing element other than when the processor is operating.

Since the area used when the processor operates is ensured as a test writing area on the magnetic recording medium, failure of test writing due to insufficient free space of the magnetic recording medium can be prevented. As a result, optimization of the prescribed setting information at the time of writing to the magnetic recording medium can reliably be done.

Preferably, the prescribed setting information includes one of or both of pulse width of generated magnetic field and maximum value of generated magnetic field.

By changing the pulse width at the time of magnetic field generation, the timing of writing to the magnetic recording cell can be adjusted. By optimizing the pulse width by the processor, recording error at the time of recording in the magnetic recording apparatus can be reduced. Further, by changing the maximum value of the generated magnetic field, the magnetic force held by the magnetic recording cell can be adjusted, and the information can be recorded with appropriate magnetic field strength to the magnetic recording cell. By optimizing the optimal value of the generated magnetic field by the processor, it is possible to reduce recording error resulting from insufficient strength of magnetic field at the time of recording to the magnetic recording cell or from magnetic field interference caused by excessive magnetization.

Preferably, the magnetic recording cells are arranged on the recording surface, with a pitch d in circumferential direction of the disk shape; the magnetic writing element and the magnetic reading element are arranged spaced by a distance L in the circumferential direction of the disk shape; and with a maximum value of skew angle of the magnetic recording head to the medium when the magnetic recording head moved in the radial direction being $\Theta$, $L(1-\cos\Theta) > d/10$.

In the magnetic recording apparatus, there is a radial range in which the timing of recording magnetic field generation deviates by the time period corresponding to 10% of the pitch between magnetic recording cells or longer. In such a situation, recording error is likely. Therefore, in the magnetic recording apparatus of which maximum skew angle is $\Theta$ and the equation above is satisfied, execution of test writing as described above is particularly desirable.

According to a second aspect, the present invention provides a magnetic recording evaluating apparatus, including: a spindle detachably holding a disk-shaped magnetic recording medium having a recording surface on which a plurality of magnetic recording cells magnetically isolated from each other are arranged; a spindle motor for rotating the spindle; a joining mechanism detachably holding, over the recording surface of the magnetic recording medium held by the spindle, a suspension having a magnetic writing element generating magnetic field in accordance with write information and recording information in the magnetic recording cells of the magnetic recording medium under a condition in accordance with prescribed setting information and a magnetic reading element reproducing information recorded in the magnetic recording cells of the magnetic recording medium held by the spindle arranged to maintain a constant positional relation; a driving mechanism for moving the magnetic writing element and the magnetic reading element arranged on the suspension held by the joining mechanism in the radial direction over the recording surface of the magnetic recording medium; and a test write module, responsive to a test write start signal, for repeating, while the magnetic recording medium is held by the spindle and the suspension is held by the joining mechanism, writing and reproduction of test information by the magnetic writing element and the magnetic reading element and calculation of a prescribed quality index value representing quality of writing of the reproduced test information, with the prescribed setting information changed, and based on result of repetition, for optimizing and outputting the prescribed setting information so that the prescribed quality index value satisfies a predetermined condition.

The magnetic recording evaluating apparatus repeats writing and reproduction of test information to the magnetic recording medium and calculation of quality index value representing the quality of writing of the test information, with the prescribed setting information related to the magnetic writing element varied, on the magnetic recording medium set on the spindle. Then, the prescribed setting information with which the quality index value satisfies a predetermined condition is found, and the setting information is output. Therefore, the optimal setting information for the magnetic writing element can be obtained for the magnetic recording medium set on the magnetic recording medium evaluating apparatus. As a result, for a magnetic recording apparatus using a patterned medium as a recording medium, a magnetic recording evaluating apparatus capable of measuring characteristics of recording medium used, for reducing recording error and reproducing error, can be provided.

Preferably, the magnetic recording evaluating apparatus further includes a determining module for determining whether an output signal of the magnetic reading element matches a prescribed signal serving as a trigger of writing by the magnetic writing element. The prescribed setting information is standby time period from determination by the determining module that the output signal matches the prescribed signal until the magnetic writing element generates magnetic field.

The magnetic recording apparatus repeats writing and reproduction of test information to the magnetic recording medium and calculation of quality index value representing the quality of writing of the test information, with the prescribed setting information related to the magnetic writing element varied, on the magnetic recording medium. Then, the optimal prescribed setting information with which the quality index value satisfies a predetermined condition is found, and using the setting information, information is written. Therefore, in a magnetic recording apparatus using a patterned medium in which timing of writing to the medium is of critical importance, it becomes possible to write information to the magnetic recording medium using optimal setting information of the magnetic writing element. As a result, a magnetic recording apparatus using a patterned medium as the recording medium that can reduce recording and reproduction errors can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 schematically shows a configuration of recording/reproducing head 50 when viewed from the side of a recording medium.

FIG. 5 schematically shows a configuration of a magnetic recording medium 100 in accordance with the first embodiment.

DESCRIPTION OF THE PREFERRED EMBODIMENTS

Figure 1:
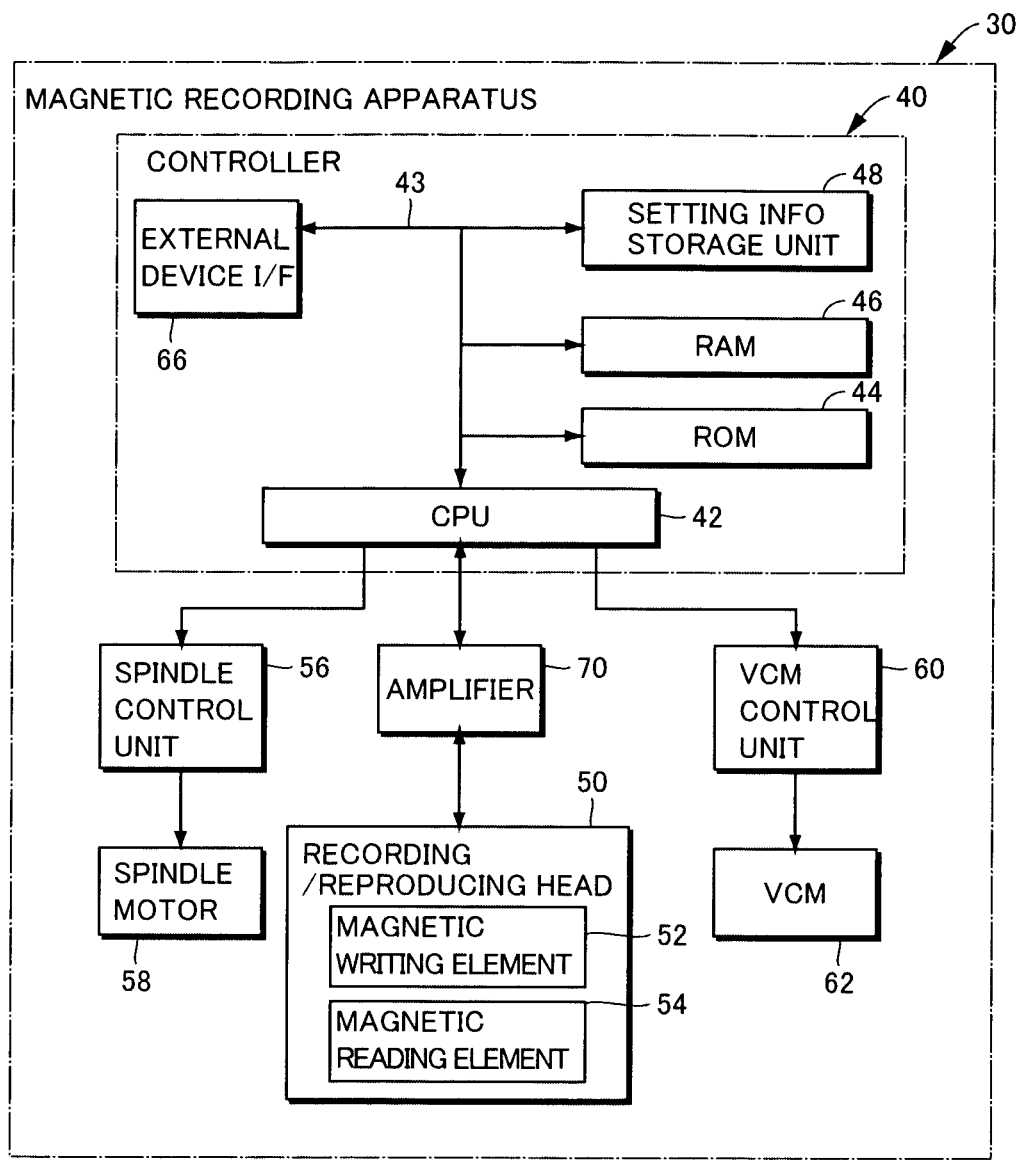
FIG. 1 is a block diagram showing a configuration of a magnetic recording apparatus 30 in accordance with a first embodiment of the present invention.

In the following, specific embodiments of the present invention will be described. In the following description and in the drawings, the same components are denoted by the same reference characters and same names. Their functions are also the same. Therefore, detailed description thereof will not be repeated.

First Embodiment

—Configuration—

Referring to FIG. 1, magnetic recording apparatus 30 includes: a controller 40 controlling operations of magnetic recording apparatus 30; a spindle motor 58 driving a spindle for rotating a disk-shaped magnetic recording medium; a spindle control unit 56 controlling the operation of spindle motor 58 in accordance with the control of controller 40; a recording/reproducing head 50 provided at a tip end of a suspension, not shown, for reading and writing magnetic information while moving relative to a recording surface of the rotating recording medium; a VCM (Voice Coil Motor) 62, which is a mechanism for driving the suspension such that recording/reproducing head 50 moves in the radial direction of magnetic recording medium mounted on the spindle; an amplifier 70 connected to controller 40 and recording/reproducing head 50, for appropriately adjusting a signal level between controller 40 and recording/reproducing head 50; and a VCM control unit 60 connected to controller 40 and VCM 62 for driving VCM 62 under the control of controller 40.

Controller 40 includes: a CPU (Central Processing Unit) 42 controlling overall operation of magnetic recording apparatus 30 by executing a prescribed program, a bus 43 connected to CPU 42, and an ROM (Read Only Memory) 44 for recording a program code and the like to be executed by CPU 42, an RAM (Random Access Memory) 46 used as a temporary storage when CPU 42 executes a program, a setting information storage unit 48 storing an optimal delay time when recording is done on the recording medium, and an external device interface 66 providing connection to an external terminal, all connected to bus 43. Spindle control unit 56 and VCM control unit 60 are both connected to CPU 42, and operate upon reception of a control signal from CPU 42. Amplifier 70 is connected to CPU 42 and recording/reproducing head 50, amplifies a reproduction signal output from recording/reproducing head 50 and applies it to CPU 42, and converts a level of a recording signal from CPU 42 to a level appropriate for recording and applies the resulting signal to recording/reproducing head 50.

Recording/reproducing head 50 includes: a magnetic writing element 52 generating a magnetic field in accordance with a recording signal from amplifier 70 and thereby recording information to recording cells on the recording medium while moving relative to the recording surface; and a magnetic reading element 54 reproducing magnetic field information recorded in magnetic recording cells of the magnetic recording medium and outputting the information as electric signals, while moving relative to the recording surface together with magnetic writing element 52.

ROM 44 and RAM 46 store pieces of information related to various settings such as strength, pulse width and generation timing of magnetic field generated by magnetic writing element 52, associated with magnetic writing element 52 and magnetic reading element 54 included in recording/reproducing head 50. ROM 44 and RAM 46 further store pieces of information related to settings such as signal amplitude for magnetic reading element to distinguish a track to be followed, signal amplitude for distinguishing an area, arrangement information, and a table representing correspondence between the signal amplitude and the amount of movement in the radial direction of recording/reproducing head 50.

Figure 2:
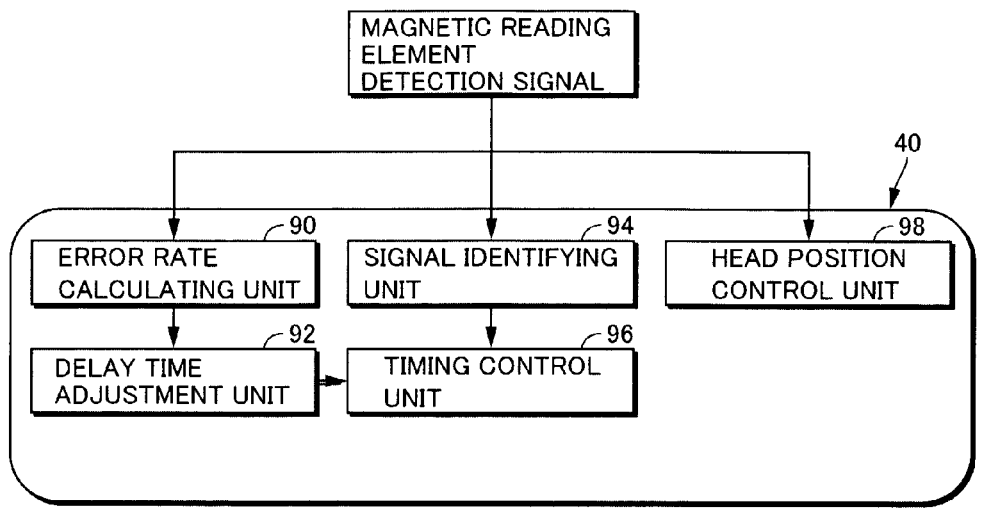
FIG. 2 is a block diagram showing a functional configuration for controlling a recording/reproducing head 50, realized by a CPU 42 executing a prescribed program.

Referring to FIG. 2, the functional block realized by cooperation of hardware and software when the CPU of controller 40 executes prescribed program codes includes: an error rate calculating unit 90 for calculating, at the time of delay time adjustment, error rate of reproduced data for each delay time, when test write is done by writing test data to the magnetic recording medium using various different delay times; a delay time adjustment unit 92, receiving the error rate calculated for each delay time from error rate calculating unit 90, adjusting the delay time to attain lower error rate, and storing it in setting information storage unit 48 shown in FIG. 1; a signal identifying unit 94 for identifying a reference timing as a reference of the timing for generating magnetic field, based on a signal detected by the magnetic reading element at the time of operation; a timing control unit 96, reading the delay time adjusted by delay time adjustment unit 92 from setting information storage unit 48, and causing magnetic writing element 52 to start generation of a magnetic field at a timing delayed from the reference timing detected by signal identifying unit 94 by the delay time read from delay time adjustment unit 92; and a head position control unit 98, calculating position information of recording/reproducing head 50 from the detection signal of magnetic reading element 54, transmitting a movement instruction to VCM control unit 60 and thereby controlling radial position of recording/reproducing head 50 with respect to the magnetic recording medium.

Head position control unit 98 realizes tracking control for recording and reproduction following a prescribed track, by feedback-radial position control. Specifically, head position control unit 98 detects a servo pattern recorded on the recording medium from signal waveform of a detection signal from magnetic reading element 54, determines off-track direction and off-track amount by looking up arrangement information and identifying information of the servo pattern, and controls the head position accordingly.

Figure 3:
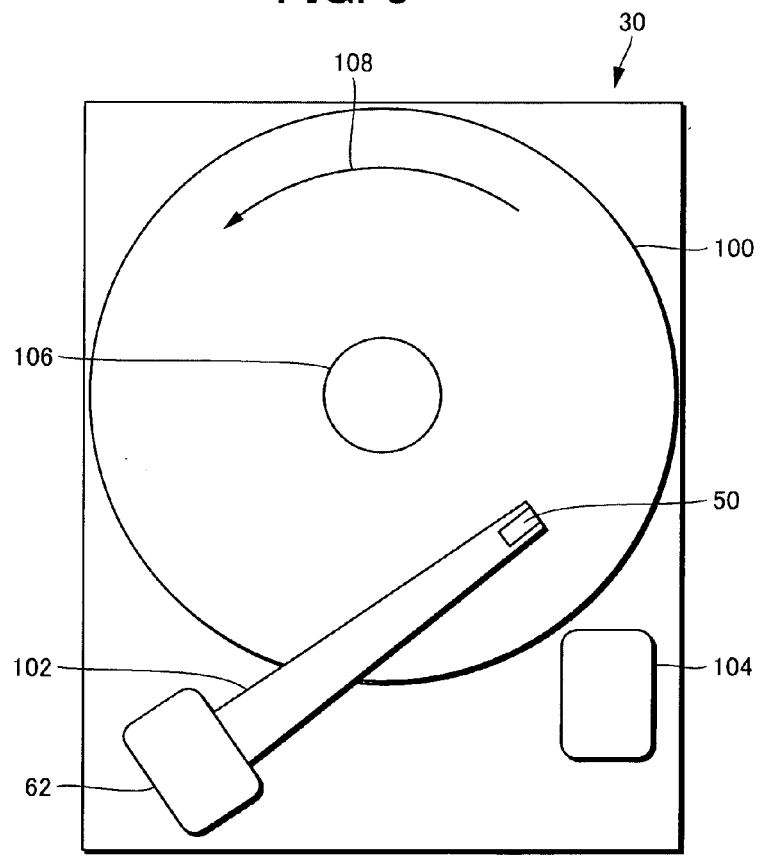
FIG. 3 shows an internal configuration of magnetic recording apparatus 30.

Referring to FIG. 3, magnetic recording apparatus 30 further includes a magnetic recording medium 100 as a magnetic medium of patterned medium, and a spindle 106 driven by spindle motor 58.

Magnetic recording medium 100 has a disk-shape and has a hole formed at the center, to which spindle 106 is fit. When fit in magnetic recording medium 100, spindle 106 rotates magnetic recording medium 100 in the direction of an arrow 108.

Magnetic recording apparatus 30 further includes: a suspension 102 driven by VCM 62 (see FIG. 1) to rotate about one end and having recording/reproducing head 50 provided on a lower surface of the other end; and a ramp mechanism 104 provided at a resting position of recording/reproducing head 50.

Suspension 102 is driven by VCM 62 such that its tip end is movable in the radial direction over magnetic recording medium 100.

Since recording/reproducing head 50 is provided at the tip end of suspension 102, recording/reproducing head 50 can change its position in the radial direction of magnetic recording medium 100 in accordance with the operation of VCM 62.

Referring to FIGS. 3 and 4, recording/reproducing head 50 includes a magnetic writing element 52 for applying a magnetic field in a direction vertical to magnetic recording medium 100, and a magnetic reading element 54 detecting the magnetic field recorded on magnetic recording medium 100 and outputting en electric signal, both arranged on a surface facing magnetic recording medium 100 (surface closer to magnetic recording medium 100).

When information is to be stored in magnetic recording medium 100, magnetic writing element 52 applies magnetic field having strength sufficient to record the information. At this time, direction of the magnetic field to be applied is also taken into account. In the present embodiment, it is assumed that the direction of magnetic field going from the near side to the depth side of the figure in FIG. 4 is the downward direction and the direction of magnetic field coming from the depth side to the near side of the figure is the upward direction. When information is to be recorded on magnetic recording medium 100, a downward magnetic field or an upward magnetic field is applied.

The positional relation between magnetic writing element 52 and magnetic reading element 54 in the circumferential direction when viewed from magnetic recording medium 100 is as follows. Specifically, the positional relation is such that when recording/reproducing head 50 passes over an arbitrary position of rotating magnetic recording medium 100, magnetic reading element 54 passes first and magnetic writing element 52 passes thereafter, over the arbitrary position. Therefore, recording/reproducing head 50 outputs the detection signal of magnetic reading element 54 first, and thereafter, stores information by magnetic writing element 52.

Here, recording and reproduction of magnetic information to and from magnetic recording medium 100 in magnetic recording apparatus 30 will be described. In the absence of magnetization in the magnetization detection area, magnetic reading element 54 of magnetic recording apparatus 30 outputs a signal of zero level (as will be described later) from magnetic recording medium 100. If there is a downward magnetization, it outputs a positive signal. If there is an upward magnetization, it outputs a negative signal.

Referring to FIG. 5, magnetic recording medium 100 is a magnetic recording medium of patterned medium, including a plurality of magnetically isolated columnar magnetic recording cells 130. It is a magnetic recording medium of the type in which information is recorded when magnetization is done in a direction vertical to the surface of the recording medium.

Magnetic recording medium 100 includes a user data area 132 recording user data and a servo pattern area 134 set in advance, in which the direction of magnetic field is unchanged. The user data area includes magnetic recording cells 130, and magnetic information is recorded/reproduced by magnetic recording apparatus 30. In servo pattern area 134, the direction of magnetic field is unchanged and, therefore, a signal from the servo pattern area is used as a detection signal, for example, as a tracking servo pattern.

In magnetic recording medium 100, a plurality of tracks are arranged concentrically at an equal interval, that is, at a constant pitch (in the example of FIG. 5, 50 nm), in the radial direction of magnetic recording medium 100. On each of the plurality of tracks, the afore-mentioned magnetic recording cells 130 are arranged. Specifically, when viewed using each track as a reference (by way of example, when a chain-dotted line 136 is viewed as one of the plurality of tracks), magnetic recording cells 130 are arranged on a line. In magnetic recording medium 100 in accordance with the present embodiment, the size of magnetic recording cell 130 is 25 nm in diameter and 40 nm in height.

Referring to FIG. 5, in the present embodiment, the direction indicated by an arrow 140 is the rotating direction of magnetic recording medium 100. Therefore, magnetic recording apparatus 30 successively detects signals from magnetic recording cells 130 on the right side of FIG. 5, of magnetic recording medium 100.

In the following, an exemplary method of manufacturing magnetic recording medium 100 will be described.

Figure 22:
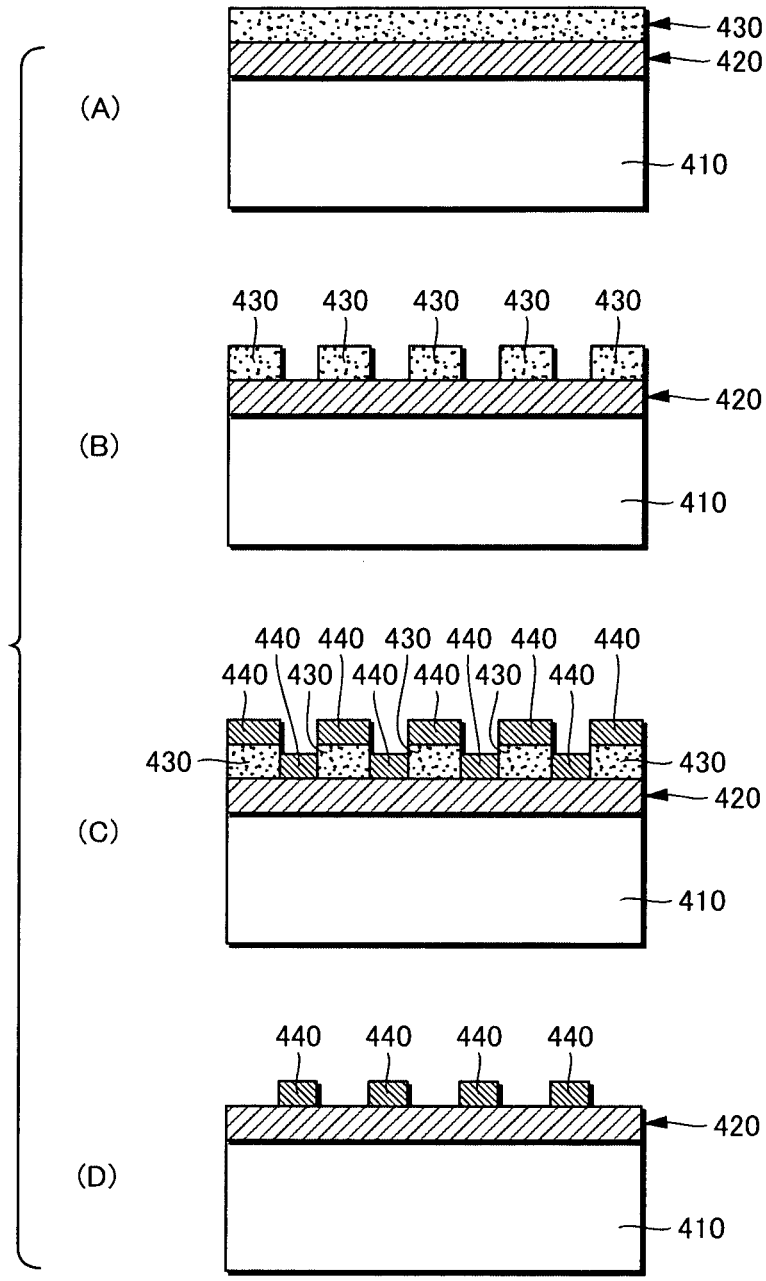
FIG. 22 illustrates a method of manufacturing magnetic recording medium 100.

Referring to FIG. 22, first, a soft magnetic layer 420 is formed on a glass substrate 410, and a resist 430 is applied to soft magnetic layer 420 (FIG. 22A). Thereafter, a fine pattern is formed on resist 430. The fine pattern refers to a pattern of arrangement of magnetically isolated magnetic recording cells 130 formed on the recording medium. In magnetic recording medium 100, circles having the diameter of about 25 nm are arranged by the fine pattern, to form columnar magnetic recording cells 130. As an example of forming the fine pattern, "electronic lithography" has been known, by which an electron beam is directed to a desired position on the resist and development is done, to form a desired pattern on the resist. When development is done in accordance with the electronic lithography, resist disappears at a portion irradiated with the electron beam, and a fine pattern is formed on the resist (FIG. 22B). After forming the fine pattern, a film of a material (for example, Co) for forming magnetic recording cells 130 is formed on the resist. At this time, at the region where resist 430 is lost, part of the material 440 forming magnetic recording cells 130 is formed on the soft magnetic layer (FIG. 22C). Thereafter, using, for example, an organic solvent, resist 430 and material 440 for magnetic recording cells 130 deposited on resist 430 are removed. At this time, material 440 forming magnetic recording cells 130 directly deposited on soft magnetic layer 420 are not removed but left (FIG. 22D). The left portions will be the magnetic recording cells 130. After resist 430 and the material 440 for forming magnetic recording cells deposited on resist 430 are removed, a non-magnetic layer is formed on substrate 410. Then, polishing of the substrate is done from the side of non-magnetic layer, whereby magnetic recording cells 130 are exposed at the surface and the substrate surface is made smooth. Finally, a lubricant is applied to the substrate on which magnetic recording cells 130 are formed.

In the method of manufacturing magnetic recording medium 100 described above, Co is used as the material for forming magnetic recording cell 130. Other metals, such as Pt, Fe, Ni, Cr, Mn and an alloy of these may be sued. Examples of the alloy include CoPt, SmCo, CoCr and TbFeCo. Further, as the method of forming a fine pattern on the resist, anode oxidization method, photolithography, nano-imprint and the like may be used, other than the electronic lithography described above.

Further, though the magnetic recording surface (a surface having magnetic recording cells 130) is formed only on one side of magnetic recording medium 100, it is not limiting, and the magnetic recording surfaces may be formed on both sides of magnetic recording medium 100. In this case, the process steps of the manufacturing method described above may be effected on both surfaces of magnetic recording medium 100. It is noted that the lubricant may be applied simultaneously to the magnetic recording surfaces formed on both sides of magnetic recording medium 100.

Figure 6:
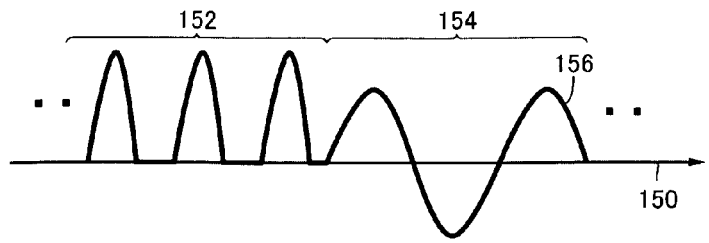
FIG. 6 shows signals detected when magnetic reading element 54 reproduces information recorded on magnetic recording medium 100 along a chain-dotted line 136 of FIG. 5.

Referring to FIG. 6, a curve 156 represents detection signals when magnetic reading element 54 reads magnetic recording medium 100 along chain-dotted line 136 of FIG. 5. When curve 156 is above the coordinate axis 150, it means that a positive signal is detected, when it is below, a negative signal is detected, and if it is on the axis 150, a zero level signal is detected.

In FIG. 6, the detection signals in an area 152 represent signals detected from servo pattern area 134, and the signals in area 154 represent signals detected from user data area 132. Referring to FIGS. 5 and 6, it can be seen that magnetic reading element 54 has detected three downward magnetizations from the left side of the figure, from servo pattern area 134. Further, it can be seen that, after detecting signals in servo pattern area 134, magnetic reading element 54 detected three magnetizations from the left side of the figure (downward, upward and downward from the order of detection), from magnetic recording cells 130 in user data area 132.

In the test write program described later, a signal from servo pattern area 134 is used as a reference signal for detection. Servo pattern area 134 is an area in which the direction of magnetization is unchanged. Therefore, it is suitable for detection of a signal to be used as a reference signal, and as a result, it is helpful to prevent recording error related to reference signal detection.

Figure 7:
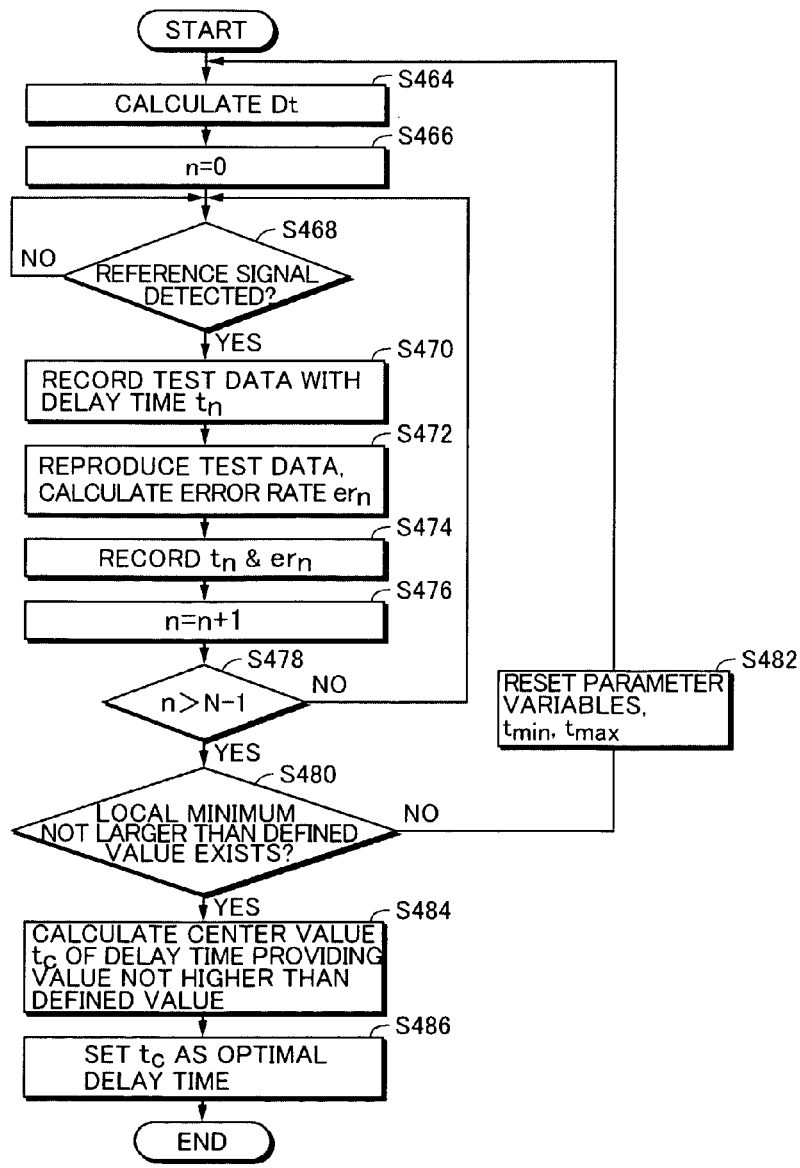
FIG. 7 is a flowchart representing a control structure of a test write program in magnetic recording apparatus 30, executed by CPU 42 of magnetic recording apparatus 30.

The test write program shown in FIG. 7 is a program for setting an optimal delay time for recording to magnetic recording medium 100 in magnetic recording apparatus 30. Here, the "delay time" refers to a time period from detection by magnetic reading element 54 of a predetermined reference signal from magnetic recording medium 100 until magnetic writing element 52 starts recording (generation of magnetic field) to magnetic recording medium 100. Specifically, a reference signal detected by magnetic reading element 54 serves as a trigger for data writing by magnetic writing element 52. In the test write program, test data is written with a certain delay time to magnetic recording medium 100, the written test data is read and error rate is calculated and recorded. Then, writing of test data and calculation of error rate are repeated with the delay time changed within a set range of delay time, and the optimal delay time with which recording error is least likely is determined. Further, it is assumed that parameter variables used in the test write program (minimum value $t_{min}$ and maximum value $t_{max}$ of initially set delay time range, number of repetition N of test writing, error rate defined value $er_m$) and the reference signal are stored in advance in the program.

Referring to FIG. 7, the program is activated when magnetic recording apparatus 30 is turned on and the adjustment of delay time is instructed. The program includes the steps of a step (hereinafter "step" will be simply denoted as "S") 464 of calculating a step value Δt of delay time from parameter variables $t_{min}$, $t_{max}$ and N; a step S466, executed following S464, of setting 0 to variable n; and a step S468 of determining whether or not magnetic reading element 54 has detected a reference signal, and branching the control flow depending on the result of determination.

The step value Δt calculated at S464 is calculated as Δt=$(t_{max}-t_{min})/(N-1)$. The step value Δt is used for changing the delay time stepwise in the test write program. Using the step value Δt, it is possible to represent the delay time $t_n$ (n=0 to N−1) corresponding to the variable n as $t_0=t_{min}$, $t_1=t_{min}+\Delta t$, ... $t_n=t_{min}+n\cdot\Delta t$, ... $t_{N-2}=t_{min}+(N-2)\cdot\Delta t$, $t_{N-1}=T_{min}+(N-1)\cdot\Delta t=t_{max}$.

The program further includes: a step S470, executed if it is determined at S468 that the reference signal is detected (YES), of recording test data in recording medium 100 with the delay time $t_n$ corresponding to the variable n using magnetic writing element 52; a step S472, executed following S470, of reproducing the test data recorded at S470 by magnetic reading element 54, and calculating the error rate $er_n$; a step S474, executed following step S472, of recording the delay time $t_n$ and the corresponding error rate $er_n$; a step S476, executed following S476, of setting variable n to n+1; and a step S478, executed following S476, of determining whether or not the variable n satisfies the condition n>N−1, and branching the flow of control depending on the result of determination. The program further includes: a step S480, executed if it is determined at S478 that the condition is satisfied (YES), of determining whether or not the error rate $er_n$ has a local minimum not larger than the preset error rate defined value $er_m$, among the recorded relations between the delay time tn and the error rate $er_n$, and branching the control flow depending on the result of determination; a step S482, executed if it is determined at step S480 that there is no local minimum (NO), of resetting the minimum value $t_{min}$ and the maximum value $t_{max}$ of the delay time range and returning to S464; a step S484, executed if it is determined at S480 that there is a local minimum (YES), of calculating the center value tc of the delay time range when the error rate attains to the defined value $er_m$ or lower; and a step S486, executed following S484, of setting tc as the optimal delay time, and storing it in setting information storage unit 48. If it is determined at S468 that the reference signal is not detected (NO), control returns to S468 and waits until the reference signal is detected. If it is determined at S478 that the condition is not satisfied (NO), the control returns to S468. After execution of S468, the program ends. In the present embodiment, S464 to S482 form a test module. S484 to S486 form a write module that writes the optimal delay time to setting information storage unit 48.

The error rate $er_n$ calculated at S472 represents the rate of error when test data is recorded on magnetic recording medium 100 with the delay time of $t_n$. Specifically, magnetic writing element 52 records test data on magnetic recording medium 100 with delay time $t_n$, magnetic reading element 54 reproduces the recorded test data, and the rate is calculated from the reproduced result. As an example of calculation of the error rate, it is calculated as "error rate=(number of data erroneously recorded (read)/(total number of recorded test data)." Here, the maximum value of error rate is 1, and the minimum value is 0. If the error rate is closer to 0, it means that the number of errors is smaller and the performance is better.

Figure 8:
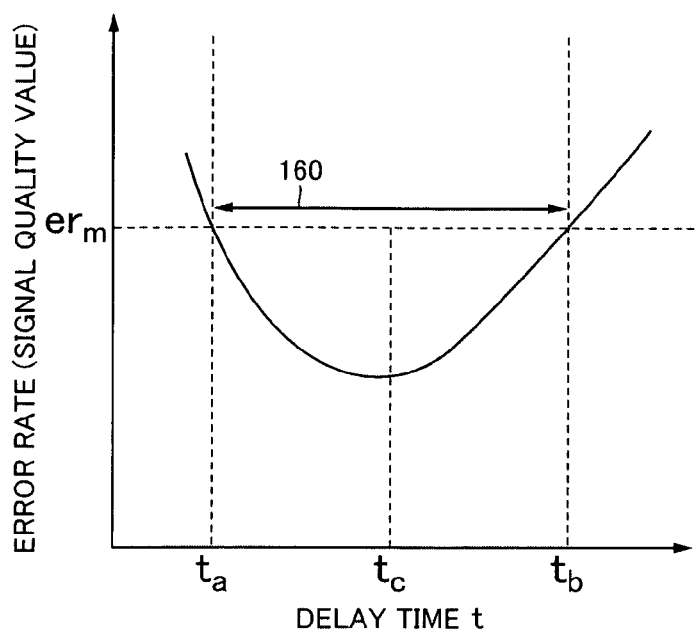
FIG. 8 shows a relation between delay time (standby time period) and error rate recorded at S474 of the program shown in FIG. 7.

Referring to FIG. 8, an arrow 160 represents the range of delay time t with which the error rate attains to the preset error rate defined value $er_m$ or lower. The range of delay time with which the error rate attains to the preset error rate defined value $er_m$ or lower as represented by arrow 160 will be referred to as a "margin" of the delay time. Further, the minimum time with which the error rate attains to the defined value or lower is denoted by $t_a$, and the maximum time is denoted by $t_b$.

In the program shown in FIG. 7, the local minimum at S480 represents the minimum value in the range in which the curve plotted by the error rate in the measured range of delay time is convex downward, when there is such a relation between the delay time and the error rate as shown in FIG. 8.

At S484, $t_c$ is calculated as $t_c=(t_b+t_a)/2$.

At S482, if parameter variables $t_{min}$ and $t_{max}$ are to be reset, the minimum value $t_{min}$ and the maximum value $t_{max}$ of delay time are reset such that the range of delay time to be measured becomes larger, that is, to increase the value of $|t_{max}-t_{min}|$.

—Operation—

Magnetic recording apparatus 30 in accordance with the first embodiment operates in the following manner.

When the power is turned on and the optimization process of the recording medium is selected, CPU 42 of magnetic recording apparatus 30 calculates the step value Δt of delay time from the parameter variables (minimum value $t_{min}$ and maximum value $t_{max}$ of delay time range, and the number of repetition N of test writing) (step S464). After 0 is input to variable n (S466), magnetic recording apparatus 30 determines whether or not magnetic reading element 54 detected a reference signal from magnetic recording medium 100 (S468). If the reference signal has been detected (YES at S468), magnetic writing element 52 records test data to magnetic recording medium 100 with delay time $t_0=t_{min}$ (S470). After recording the test data with delay time $t_0$, magnetic reading element 54 reproduces the test data, the result of reproduction is compared with the original test data to calculate the error rate $er_0$ corresponding to the delay time $t_0$ (S472), and the values $t_0$ and $er_0$ are recorded (S474). Thereafter, n+1 is input to variable n (S476), and whether or not variable n satisfies n>N−1 is determined (S478). Here, variable n is 1 and assuming the number N of repetition of test writing to be 100, for example, the condition of S478 is not satisfied (NO) and, therefore, the control returns to S468. Thereafter, the process steps S468 to S474 are performed with n=1, the error rate $er_1$ corresponding to the delay time $t_1=t_0+1\cdot\Delta t$ is calculated and the results are recorded. Next, n+1 (=2) is input to variable n. Thereafter, these process steps are repeated until variable n satisfies the condition n>N−1. When variable n=N−1=99, the test data is recorded on magnetic recording medium 100 with delay time $t_{99}=t_{min}+99\cdot\Delta t=t_{max}$, error rate $er_{99}$ is calculated from the reproduction result, and the values $t_{99}$ and $er_{99}$ are recorded. At S476, n=100 is input to variable n. As a result, the condition of S478 is satisfied, and the control proceeds to S480.

At S480, determination is made as to whether or not the curve formed by the recorded value $er_n$ (n=0 to 99) with respect to delay time $t_n$ is downward convex and has a local minimum of defined value $er_m$ or smaller. If it is determined that the local minimum is absent (NO at S480), values $t_{min}$ and $t_{max}$ are reset such that the range of delay time, that is, the value of $t_{max}-t_{min}$, becomes larger. Then, control returns to S464, and again the error rate $er_n$ with respect to the delay time $t_n$ is calculated.

If it is determined that there is a local minimum (YES at S480), the delay times $t_a$ and $t_b$ when the error rate $er_n$ assumes the same or approximate value as the defined value $er_m$ of the error rate are determined ($t_{min} < t_a < t_b < t_{max}$), and the optimal delay time $t_c$ is calculated as $t_c = (t_b + t_a)/2$ (S484). The time $t_c$ calculated at S484 is set as the optimal delay time of magnetic recording medium 100 and recorded in setting information storage unit 48 (S486), and the test write program ends.

At the time of normal operation, magnetic recording apparatus 30 operates in the following manner.

When data is to be recorded on magnetic recording medium 100, magnetic recording apparatus 30 reads magnetic recording medium 100 using magnetic reading element 54, and detects a reference signal. When magnetic reading element 54 detects a reference signal, magnetic writing element 52 is caused to generate a magnetic field at a timing delayed by the optimal delay time $t_c$ from the detection of reference signal, and thereby data is recorded on magnetic recording medium 100.

As described above, in magnetic recording apparatus 30, the test write program is executed. In the test write, a delay time from detection of a detection signal as a reference from the magnetic recording medium until recording of data to the magnetic recording medium is set, test data is written to the recording medium, the written data is read by the magnetic reading element, and the error rate with respect to the set delay time is calculated and recorded. The series of operations is repeated within the set range of delay time, and a value that assumes the local minimum not higher than a preset defined value of error rate is detected. Then, the delay time shorter than the delay time corresponding to the local minimum and at which the error rate assumes the same or approximate value as the defined value of error rate, and the delay time longer than the delay time corresponding to the local minimum and at which the error rate assumes the same or approximate value as the defined value of error rate are calculated, and the center value therebetween is set as the optimal delay time. At the time of normal operation, the optimal delay time is used as the delay time for writing.

Since the test data is actually recorded on the magnetic recording medium while varying the delay time and the error rate is measured in this manner, it is possible to set the optimal value of magnetic field generation timing, which is of critical importance in the magnetic recording medium using a patterned medium as a recording medium. As a result, in the magnetic recording apparatus using a patterned medium as a recording medium, it becomes possible to generate a magnetic field with highly precise timing to the magnetic recording cells formed in advance, whereby a magnetic recording apparatus enabling reduction of recording error and reproduction error can be provided.

In magnetic recording apparatus 30 in accordance with the first embodiment, the center value $t_c$ of the time range in which the error rate is not higher than the defined time $er_m$ of the error rate is used as the optimal delay time. As a result, even when an error occurs in the delay time during data recording, it is highly possible that the error rate is kept lower than the defined value.

The signal as a reference is not limited to the above. A pattern signal for clock generation, an address pattern signal, or a burst pattern signal for tracking may be used. The area from which the signal is detected is not limited to the servo pattern area, and the signal may be detected from the user data area.

In the present embodiment, the size of magnetic recording cell on the magnetic recording medium is selected to be 25 nm in diameter and 40 nm in height. The size of magnetic recording cell is not limited to such values. Preferable size of the magnetic recording cell is 5 nm to 45 nm in diameter and 10 nm to 60 nm in height. The shape of magnetic recording cell is not limited to the columnar shape, either. By way of example, it may have a quadrangular prism shape, an elliptical pillar shape, a spherical shape or any other shape, provided that it allows recording of magnetic information on magnetically isolated magnetic recording cell.

In the present embodiment, the local minimum of error rate is only one in the delay time range as shown FIG. 8. Depending on the magnetic recording medium, there may be a plurality of error rate local minimums in the delay time range. In such a case, any of the plurality of local minimums is selected, delay times shorter and longer than the delay time that corresponds to the selected local minimum at which the error rate assumes the same or approximate value as the defined value of error rate are extracted, and the center value of the extracted delay times may be used as the optimal delay time.

In magnetic recording apparatus 30, rather than using the optimal delay time calculated in the above-described manner as the delay time, any delay time $t_n$ within the delay time range in which the error rate does not exceed the defined value $er_m$ may be set as the delay time. As a result, it becomes possible to record the data with the delay time corresponding to the error rate not higher than the defined value. Further, in magnetic recording apparatus 30, the delay time within the delay time range in which the error rate does not exceed the defined value $er_m$ and corresponding to the minimum error rate may be used as the optimal delay time. By this approach, it becomes possible to generate magnetic field and thereby to record information with the delay time at which the error rate is the smallest. Here, in a graph having the delay time $t_n$ plotted on the abscissa and the error rate $er_m$ on the ordinate, the relation may not be drawn as a smooth curve because of various noises. In such a case, in order to extract more appropriate delay time, it is preferable to form an approximate curve by a quadratic curve or a trigonometric function curve such as sin, and to extract, for example, the minimum value based on the curve. In that case, it follows that one point is extracted from the approximate curve and, therefore, the delay time may not be equal to any of $t_n$ (n=0 to N−1).

Further, in the present embodiment, the error rate is considered as a value representing signal quality, and the optimal delay time is calculated using a reference value of the error rate. The value representing signal quality is not limited to the error rate. By way of example, jitter may be considered as a value representing signal quality. Jitter indicates deviation in time of the reproduced signal from the clock signal, and the smaller the jitter, the better the signal quality. The recording apparatus may include a jitter calculating unit that calculates jitter from the signal detected by the magnetic reading element, and the delay time for the magnetic recording medium may be set within the delay time range in which the jitter value calculated from the detected signal described above does not exceed a reference value. By this approach, it becomes possible to adjust when the magnetic writing element starts generation of magnetic field after how long a delay from the detection of the reference signal by the magnetic reading element. As a result, it becomes possible to start generation of magnetic field when the magnetic writing element and the magnetic recording cell satisfy such a positional relation that makes the jitter small, whereby occurrence of recording and reproduction errors can be reduced. Specifically, it is possible to know at which position with respect to the recording cell the generation of magnetic field should be started to make recording error less likely, and hence, subsequent occurrence of recording and reproduction error can be reduced.

Further, the delay time at which the jitter calculated from the detected signal becomes the smallest may be set as the optimal delay time for user data recording. By such an approach, it becomes possible to generate a magnetic field under the recording condition when the jitter is minimized. Alternatively, the center value of time range in which the jitter calculated from the detected signal is not higher than a defined value may be used as the delay time for user data recording. By such an approach, even when an error occurs in the recording timing, it is highly possible that the jitter is kept lower than the defined value.

It is preferred that the magnetic recording apparatus allows adjustment of pulse width and maximum magnetic field when the magnetic field is generated in the test write. By adjusting the pulse width when the magnetic field is generated in the test write, the timing of generating the magnetic field to the magnetic recording cell can be adjusted, and the information can be recorded at an appropriate timing to the magnetic recording cell. As a result, recording error at the time of recording can be reduced. Further, by adjusting the maximum magnetic field, the magnetic force held by the magnetic recording cell can be adjusted, and information can be recorded with appropriate magnetic field strength with respect to the magnetic recording cell. As a result, recording error caused by insufficient magnetic field strength at the time of recording to the magnetic recording cell can be reduced.

When the pulse width and the maximum magnetic field are adjusted at the time of magnetic field generation, the optimal pulse width and the optimal magnetic field strength for recording can be set in the similar manner as the above-described method of calculating delay time. Specifically, the pulse width and the magnetic field strength of generated magnetic field at the time of recording are changed as parameters, respectively, corresponding error rates are calculated, and the pulse width and the magnetic field strength corresponding to the local minimum not higher than the defined value are set as the optimal set values. It is noted that if the optimal delay time is determined first, time range of settable pulse width may possibly be narrowed. Therefore, it is preferred that the maximum pulse width for recording is set first, followed by calculation of the optimal delay time.

Further, it is preferred that the test write is executed at every constant time interval. By executing the test write periodically, it becomes possible to correct variation in optimal delay time resulting, for example, from aging of the recording/reproducing head and the magnetic recording medium, and the occurrence of error at the time of recording can be reduced continuously. Here, the constant time interval may be one year, or one hour. Further, it may be at the time when an instruction is issued to adjust the delay time to the magnetic recording apparatus, as in the embodiment above.

Further, it is preferred that the test write is executed when the error rate at the time of reproduction attains to a prescribed value or higher. By executing the test write in such a situation, it follows that even if the optimal delay time changes because of external influence such as the aging of magnetic recording medium and the number of errors increases in the magnetic recording apparatus, the optimal delay time is reset in accordance with the result of executed test write program. Since the error rate at the time of reproduction is grasped and the delay time is reset in accordance with the state of error rate, it is possible to constantly keep low the occurrence of error at the time of recording in the magnetic recording apparatus. Here, the prescribed value may be the reference value $er_m$, or a value smaller than $er_m$. Alternatively, the test write may be done using jitter. The test write may be executed when the jitter attains to a prescribed value or higher.

Figure 15:
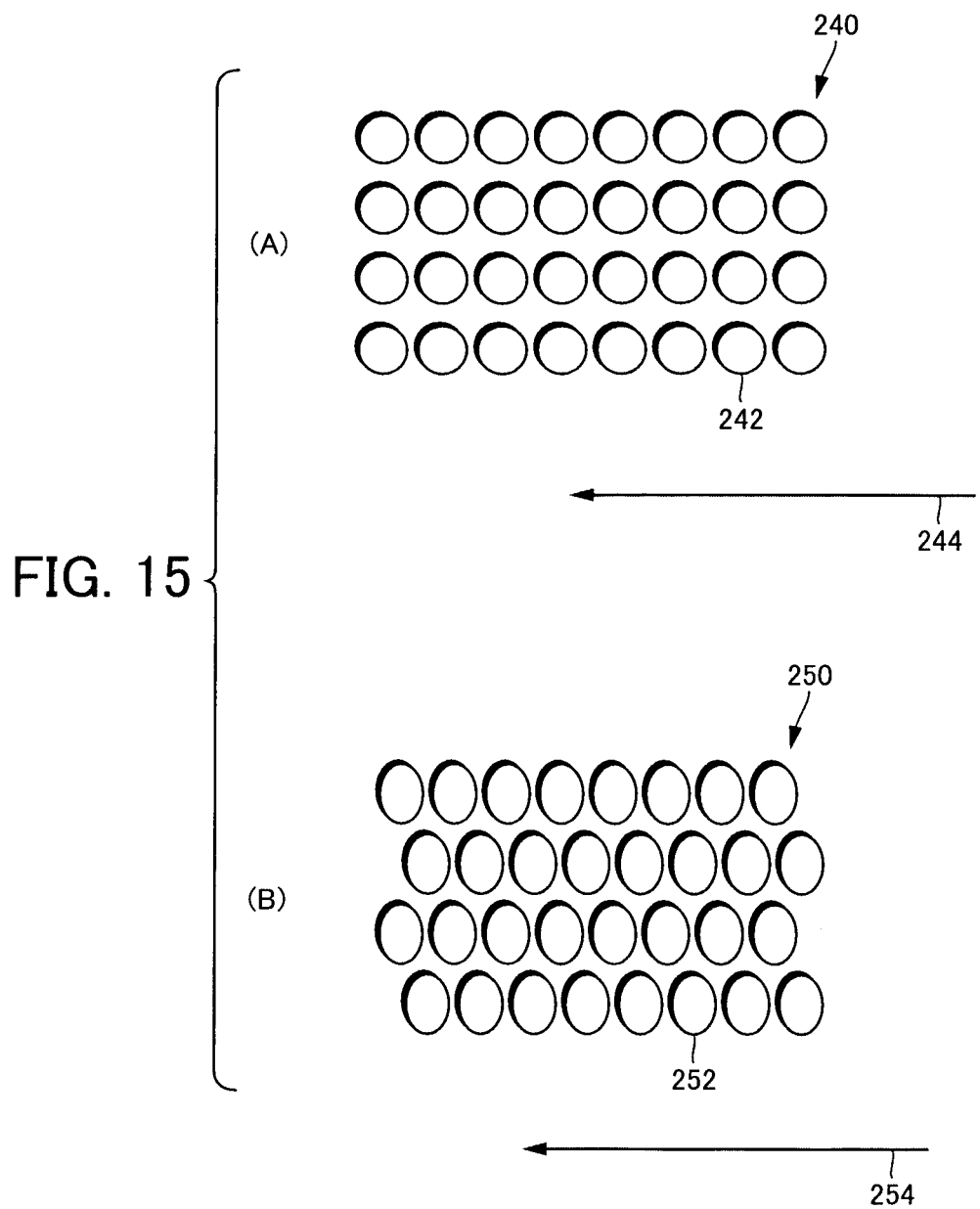
FIG. 15 shows arrangements of magnetic recording cells on the magnetic recording medium.
Figure 16:
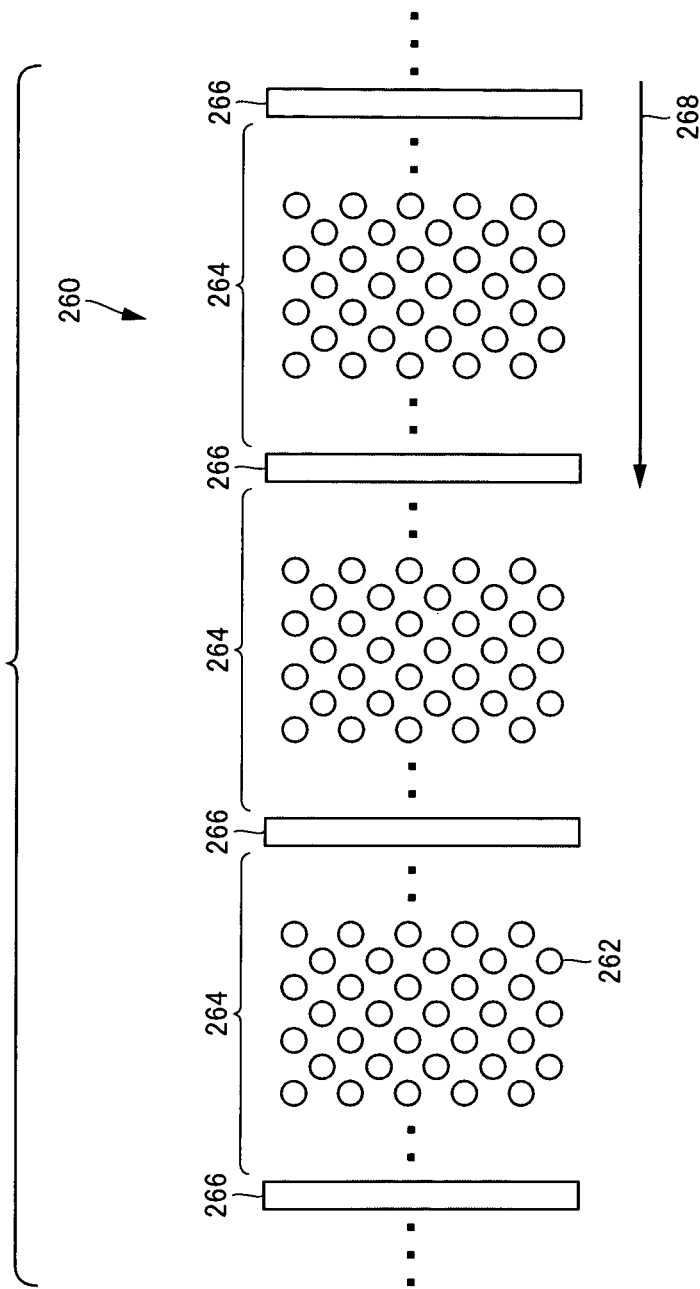
FIG. 16 shows a configuration including sector separation zone of the magnetic recording medium.

The configuration of magnetic recording medium used in the magnetic recording apparatus is not limited to the magnetic recording cell arrangement used in the above-described embodiment. Referring to FIG. 15, FIG. 15(A) shows a magnetic recording medium 240 in which magnetic recording cells 242 are arranged in a lattice. An arrow 244 indicates the circumferential direction of magnetic recording medium 240. FIG. 15(B) shows a magnetic recording medium 250 in which each magnetic recording cell 252 has an elliptical shape. An arrow 254 indicates the circumferential direction of magnetic recording medium 250. The magnetic recording medium may have such configurations as shown in (A) and (B) of FIG. 15, and the arrangement and shape of magnetic recording cells are not limited to those used in the embodiment. The magnetic recording cells of the magnetic recording medium may have any structure, including the arrangement and shape, which allow recording by the magnetic writing element and reproduction by the magnetic reading element. FIG. 16 shows an arrangement structure of magnetic recording medium 260 in which user data areas 264 including a plurality of magnetic recording cells 262 are separated by sector separating zone 266. Magnetic recording medium 260 rotates in the direction of an arrow 268. The magnetic recording medium may have such a structure as shown in FIG. 16. Sector separating zone 266 in the example of FIG. 16 may include a servo pattern area, and it may store servo pattern information and address pattern information.

The present embodiment is directed to an example in which a signal of 1 bit is recorded on one magnetic recording cell. A number of magnetic recording cells may be regarded as a group of magnetic recording cells, and one group of magnetic recording cells may be used for recording 1 bit. In that case also, recording error can be reduced by executing the above-described test write. In such an example, though recording density decreases, reproduction error is less likely even if an erroneously recorded magnetic recording cell exists among the cells, since a correct signal can be obtained from other cells. When a signal of 1 bit is to be recorded on a group of magnetic cells as a set of magnetic recording cells, it is the case that the smaller the number of magnetic recording cells included in the group, the higher the possibility that a recording error to each magnetic recording cell leads to a reproduction error. Therefore, the above-described test write is more effective in a magnetic recording apparatus in which a signal of 1 bit is recorded on one magnetic recording cell as in the embodiment described above.

By way of example, assume that a group of magnetic recording cells include three magnetic recording cells, and 1 bit is recorded on the group of magnetic recording cells. When correct recording is done on two of the three magnetic recording cells and erroneous recording is done on the remaining one because of deviation in magnetic field generation timing (the position of magnetic writing element is deviated from the magnetic recording cell), a reproduction error is unlikely, since correct information can be obtained from the two magnetic recording cells. On the other hand, assuming that 1 bit is to be recorded on one magnetic recording cell, an erroneous recording caused by deviation in magnetic field generation timing (the position of magnetic writing element is deviated from the magnetic recording cell) highly likely leads to a reproduction error.

Figure 23:
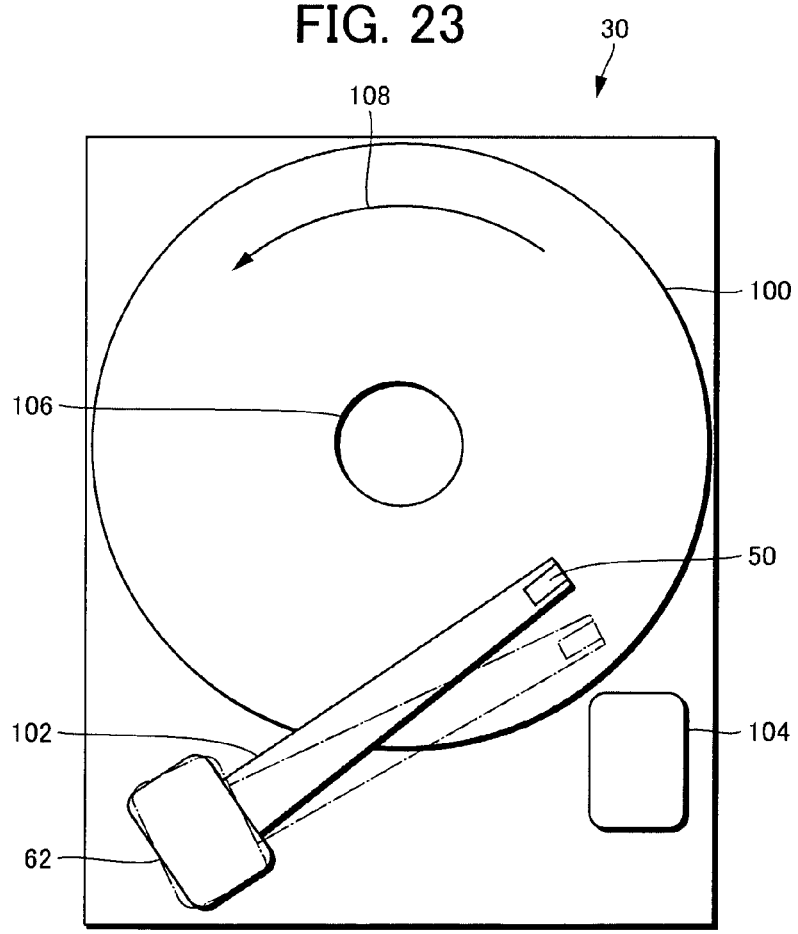
FIG. 23 shows a change in position of recording/reproducing head 50 when recording/reproduction is done at different radial positions.

When recording/reproduction is to be done at different positions in the radial direction, in magnetic recording apparatus 30, the positions of VCM, the suspension and the recording/reproducing head are as represented by dotted lines in FIG. 23 (FIG. 23 shows an example in which recording/reproduction is done on an outer circumferential side). Therefore, there is generated a skew angle between recording/reproducing head 50 and magnetic recording medium 100, and the distance L between magnetic writing element 52 and magnetic reading element 54 in the circumferential direction of the magnetic recording medium changes. This point will be described with reference to the schematic illustration of FIG. 24.

Figure 24:
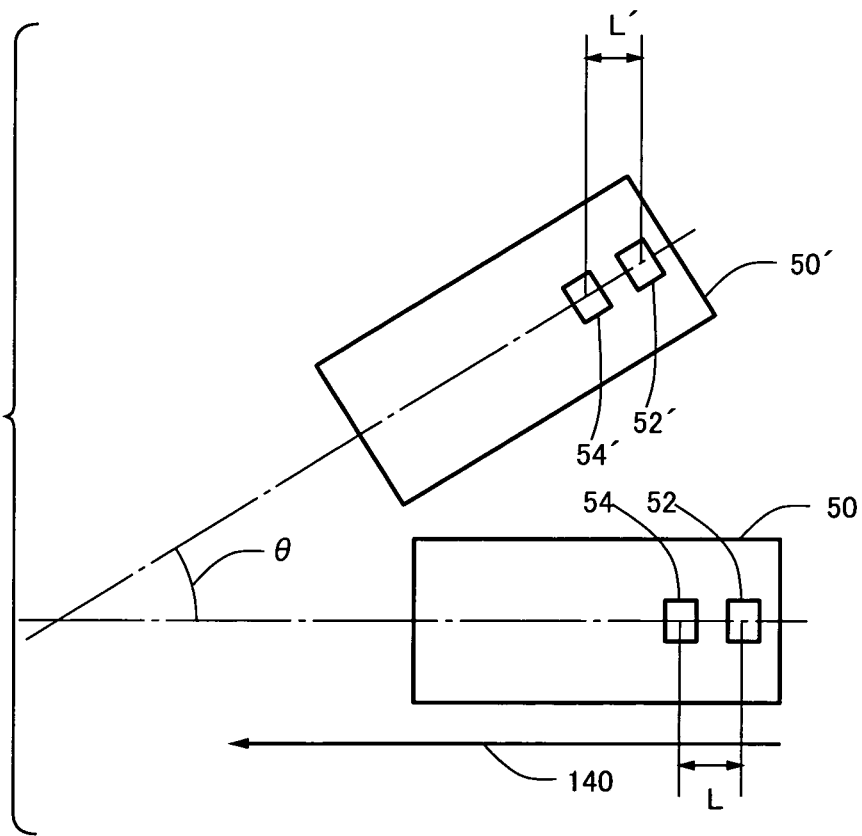
FIG. 24 is a schematic diagram showing a change in the distance L between a magnetic writing element 52 and a magnetic reading element 54 to the circumferential direction.

FIG. 24 shows magnetic writing element 52 and magnetic reading element 54 arranged at a distance L between each other, parallel to the direction of rotation (circumferential direction) 140 and recording/reproducing head 50', magnetic writing element 52' and magnetic reading element '54 at a skew angle of θ with respect to the direction.

With the skew angle θ, the distance L' between magnetic writing element 52' and magnetic reading element 54' in the circumferential direction of the magnetic recording medium is given by L'=L cos θ, and the difference ΔL between L and L' is ΔL=L(1−cos θ). Let us represent the pitch between the magnetic recording cells arranged on the magnetic recording medium in the circumferential direction by d. If there is a range of θ (range in the radial direction of the medium) that satisfies the relation of ΔL>d/10, that is, L(1−cos θ)>d/10 and if there is a range in which the distance L changes larger by 10% the pitch between the magnetic recording cells, it follows that there is a range in which the timing of generation of the recording magnetic field deviates for more than the time period corresponding to 10% of the pitch between the magnetic recording cells. As described as a problem above, recording error tends to occur in such a situation. Therefore, in a magnetic recording apparatus in which the maximum value of skew angle attains to Θ and L(1−cos Θ)>d/10, the test write should preferably be executed in the similar manner as described above. For example, if the maximum values of distance L, pitch d and the skew angle are 1 μm, 30 nm and 5°, respectively, then L(1−cos Θ)=3.8 (nm) and d/10=3 (nm) and hence, L(1−cos θ)>d/10. Therefore, execution of the test write is desirable.

Further, a thermal assist type magnetic recording medium, in which recording and reproduction are done by locally increasing the temperature using, for example, a light beam, may be used as the magnetic recording medium in the magnetic recording apparatus. Alternatively, a microwave assisted type magnetic recording medium, in which information is recorded by locally reducing reversal magnetic field using microwave energy or the like may be used. In such a case, a microwave generating source may be newly provided on the recording/reproducing head. By using such magnetic recording media, it becomes possible to realize a magnetic recording apparatus of large capacity less prone to recording error.

The method of determining the delay time for user data recording is not limited to the above. By way of example, SAM (Sequenced Amplitude Margin) having high correlation with the error rate in PRML (Partial Response Maximum Likelihood) method may be used. Besides, as the value indicating the signal quality, amplitude of a signal detected by the magnetic reading element may be used, and the delay time may be set such that the amplitude is kept within a prescribed defined range. If the signal amplitude is used as the value indicating the signal quality, however, different from the examples using the error rate and the jitter described above, the larger value represents better signal quality. Therefore, "local minimum", "minimum" and "convex downward" used with respect to the error rate correspond to "local maximum", "maximum" and "convex upward" for the amplitude, respectively.

Modification of the First Embodiment

In the following, a modification of the magnetic recording apparatus in accordance with the first embodiment will be described.

Modification 1

Figure 9:
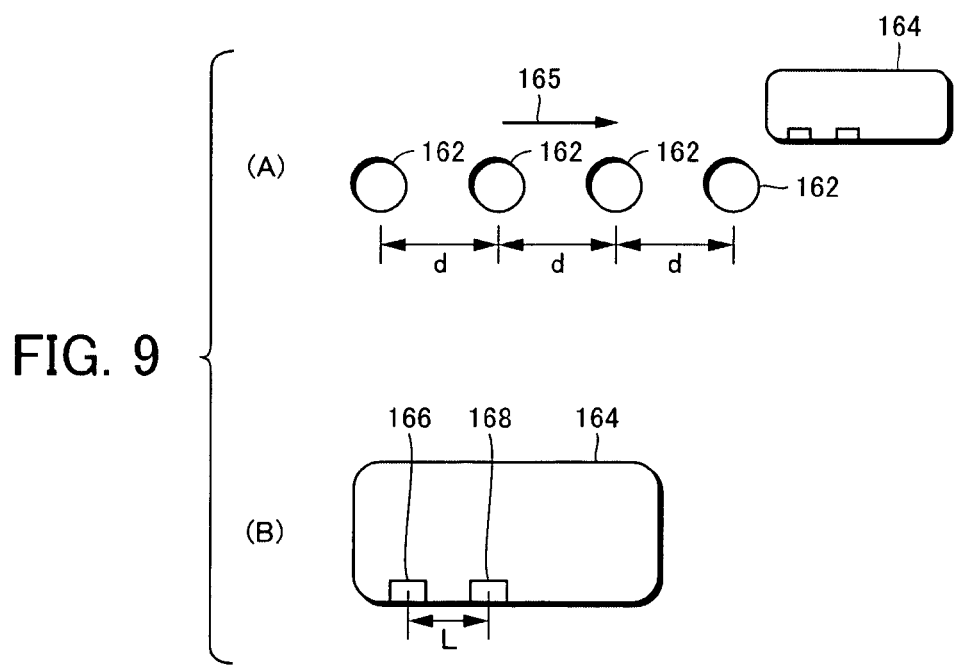
FIG. 9 shows a positional relation between the magnetic recording medium and the recording/reproducing head in the magnetic recording apparatus.

Referring to FIG. 9, FIG. 9(A) shows an arrangement of magnetic recording cells 162 in the user data area of the magnetic recording medium. Referring to FIG. 9(A), magnetic recording cells 162 in the user data area are arranged at a pitch d in the circumferential direction, and move in the direction of an arrow 165 at a linear velocity v.

FIG. 9(B) shows a recording/reproducing head 164 of Modification 1. Referring to FIG. 9(B), a magnetic writing element 166 and a magnetic reading element 168 are arranged with their central positions spaced by a distance L in the circumferential direction. The distance L in the circumferential direction can be calculated from the distance between magnetic writing element 166 and magnetic reading element 168 (from design value or the like not including error) and the skew angle of recording/reproducing head 164.

Figure 10:
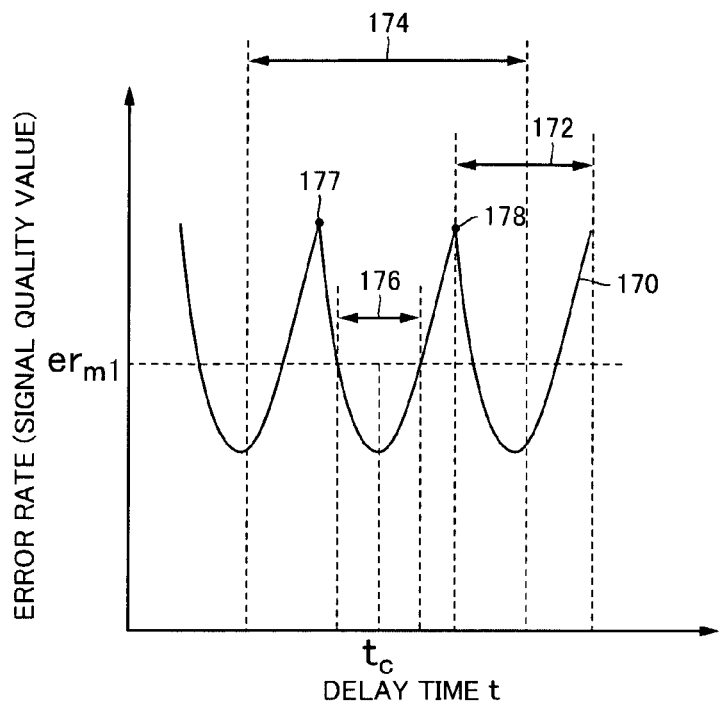
FIGS. 10 and 11 are graphs representing relation between delay time t and the error rate when the magnetic recording medium of FIG. 9(A) is used.

In the graph of FIG. 10, the abscissa represents delay time t and the ordinate represents the error rate. The reference value of error rate is $er_{m1}$. Referring to FIG. 10, a curve 170 represents the error rate value corresponding to the delay time t, an arrow 174 represents an initially set range of delay time in the test write, an arrow 172 represents a time period width of curve 170 that periodically changes, and an arrow 176 represents a margin when the error rate reference value is $er_{m1}$.

When the conditions of FIG. 9(A) are satisfied, the relation between the delay time t and the error rate is plotted as a periodic graph having the time period width of arrow 172, as shown in FIG. 10. The time period width here is d/v. Here, if the initially set range of delay time for the test write indicated by arrow 174 is made larger than 2 d/v, at least one curve, which is a continuous curve corresponding to the time period width d/v and having a local minimum, between two top vertexes (points 177, 178), is obtained. At this time, it is assumed that the error rate reference value $er_{m1}$ is larger than the local minimum.

By setting the initially set range of delay time in the test write to be larger than 2 d/v, the determination at S480 of the program shown in FIG. 7 is always YES (there is a local minimum not higher than the defined value of error rate). As a result, it becomes unnecessary to execute the test write program again after changing $t_{min}$ and $t_{max}$ representing the initial range of delay time and, hence, it becomes possible to complete the test write in a short period of time.

As regards the initially set range of delay time, when magnetic writing element 166 and magnetic reading element 168 are arranged spaced by the distance L in the circumferential direction as in the case of recording/reproducing head 164 shown in FIG. 9(B), it is preferable that the minimum value $t_{min}$ of the initially set range of delay time is made larger than L/v.

In the first embodiment, the delay time represents the time period from when the reference signal in the servo pattern area is detected by the magnetic reading element until the magnetic writing element generates a magnetic field for recording. The magnetic recording medium passes the magnetic reading element and the magnetic writing element in this order. Therefore, if the minimum value $t_{min}$ of the delay time is smaller than L/v, it means that the magnetic field is generated in the servo pattern area in which magnetic recording is impossible. Thus, the test write is invalid. In the test write program, if the minimum value $t_{min}$ of the initially set range of delay time is made larger than L/v, the test write can be done reliably in the user data area. As a result, detection of error rate can be done efficiently in the test write.

Figure 11:
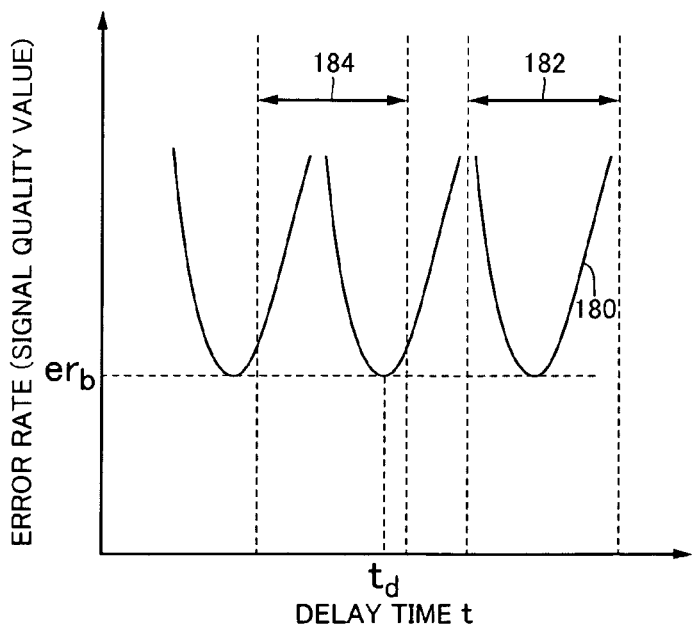

In the graph of FIG. 11, the abscissa represents delay time t and the ordinate represents the error rate. The reference value of error rate is $er_b$. Referring to FIG. 11, a curve 180 represents the error rate value corresponding to the delay time t, an arrow 184 represents an initially set range of delay time in the test write, and an arrow 182 represents a time period width of curve 180 that periodically changes.

When the conditions of FIG. 9(A) are satisfied, the relation between the delay time t and the error rate is plotted as periodic graphs having the time period width of arrow 172, as shown in FIG. 11. The time period width here is d/v. Further, the periodic graphs have a common local minimum $er_b$. Here, as the optimal delay time, the delay time with which the error rate becomes the smallest, that is, the value of signal quality attains the best, is used. Then, if the initially set range of delay time (indicated by arrow 184) for the test write is made larger than d/v, a continuous curve having the local minimum can be obtained by one test write, and the optimal delay time can be set therefrom.

If the optimal delay time is set as the delay time corresponding to the minimum error rate, that is, the best signal quality value, it is possible to obtain the optimal delay time simply by one test write by setting the initially set range of delay time for the test write to be larger than d/v. As a result, it becomes possible to complete the test write in a short period of time.

In the present embodiment, the "delay time" is defined to be the time period from when magnetic reading element 54 detects a predetermined reference signal from magnetic recording medium 100 until magnetic writing element 52 starts recording (generation of magnetic field) to magnetic recording medium 100. A related time period may be defined to be the delay time. By way of example, the "delay time" may be the time from when signal identifying unit 94 specifies a reference timing as a reference for generating the magnetic field until magnetic writing element 52 generates the magnetic field. By defining a time period from a certain operation related to detection of a reference timing until an operation related to the start of recording as the "delay time," the same effect as described above can be attained.

Modification 2

In the following, an example will be described in which the magnetic recording medium used in the magnetic recording apparatus does not have a serve data area.

Figure 12:
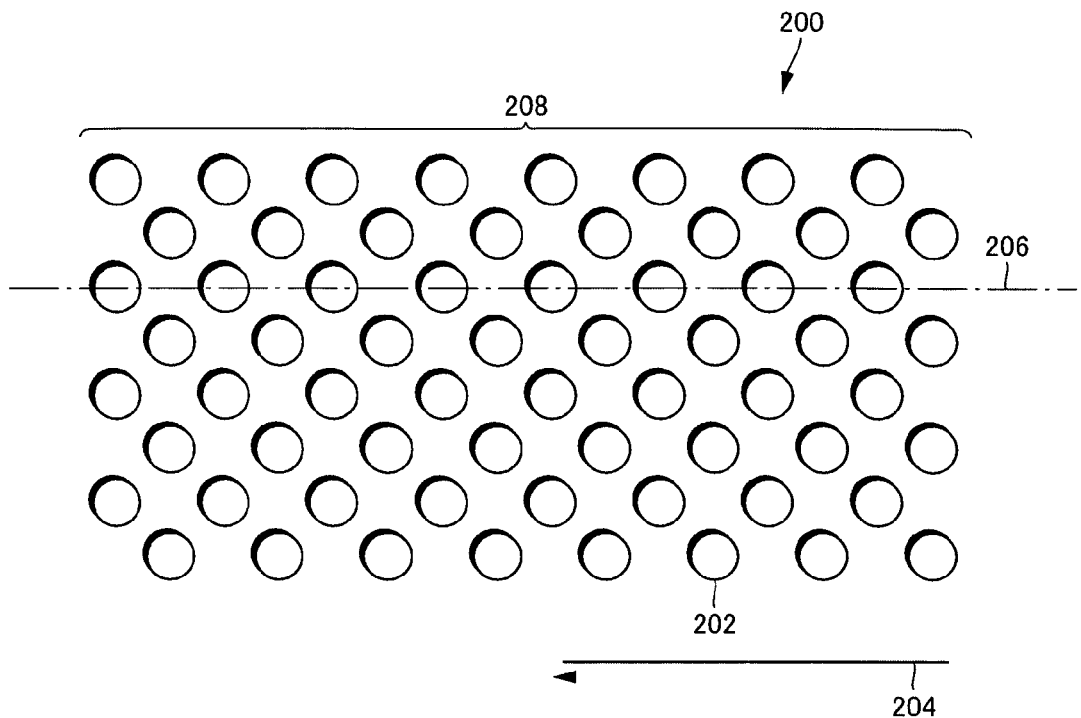
FIG. 12 shows a schematic configuration of a magnetic recording medium not having a serve data area.

Referring to FIG. 12, a magnetic recording medium 200 consists only of a user data area 208 for recording/reproducing user data, including a plurality of magnetic recording cells 202. A signal used as a reference in the test write is detected at least from a part of user data area 208. An arrow 204 indicates the circumferential direction (direction of rotation of the medium) of magnetic recording medium 200. In magnetic recording medium 200, a plurality of tracks are arranged concentrically at an equal interval in the radial direction of magnetic recording medium 200. On each of the plurality of tracks, the afore-mentioned magnetic recording cells 202 are arranged. A dotted line 206 represents one of the plurality of tracks.

Figure 13:
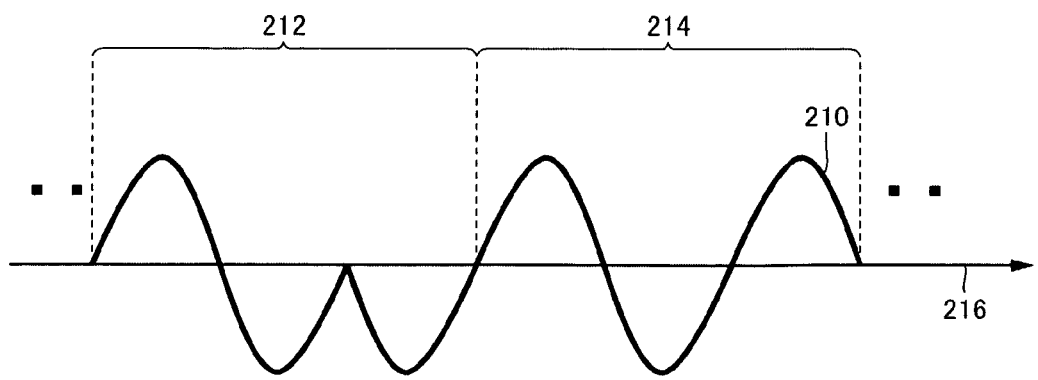
FIG. 13 shows signals detected when the magnetic reading element reads magnetic recording medium 200 along a dotted line 206 of FIG. 12.

Referring to FIG. 13, a curve 210 represents detection signals when magnetic recording medium 200 is read along the dotted line 206 of FIG. 12. When curve 210 is above the coordinate axis 216, it means that a positive signal is detected, when it is below, a negative signal is detected, and if it is on the axis 216, a zero level signal is detected.

In FIG. 13, the detection signals appearing in an area 212 are signals detected from a user data area 208 of magnetic recording medium 200, and these are preset reference signals. In Modification 2, the time period from the detection of this signal until the magnetic writing element starts recording (generation of magnetic field) is used as the delay time. Signals appearing in an area 214 are also signals detected from user data area 208, and these signals represent the recorded user data.

Referring to FIG. 13, from the left side of the figure, three signals (signals magnetized downward, upward and upward in the order of detection) are the reference signals, and after detection of the reference signals, from the left side of the figure, three signals (signals magnetized downward, upward and upward in the order of detection) are detected as user data signals.

In Modification 2, the reference signal detected at S468 is the signal detected from user data area 208. Using the reference signal, the test write program is executed in the similar manner as in the first embodiment, and the optimal delay time can also be calculated for the magnetic recording medium not provided with the servo data area.

As described above, even for a magnetic recording medium not provided with the servo data area to ensure larger data storage capacity of the magnetic recording medium, it is possible to calculate the optimal delay time by conducting the test write. As a result, a magnetic recording apparatus enabling reduction of errors at the time of recording and reproduction even when a magnetic recording medium having larger capacity not provided with the servo pattern is used in the magnetic recording apparatus can be provided.

In the magnetic recording medium not provided with the servo data area, it is assumed that tracking servo is done by detecting leakage magnetic field from magnetic recording cells in the user data area.

Modification 3

In the following, an example will be described in which an area for the test write is allocated in advance on the magnetic recording medium used in the magnetic recording apparatus.

Figure 14:
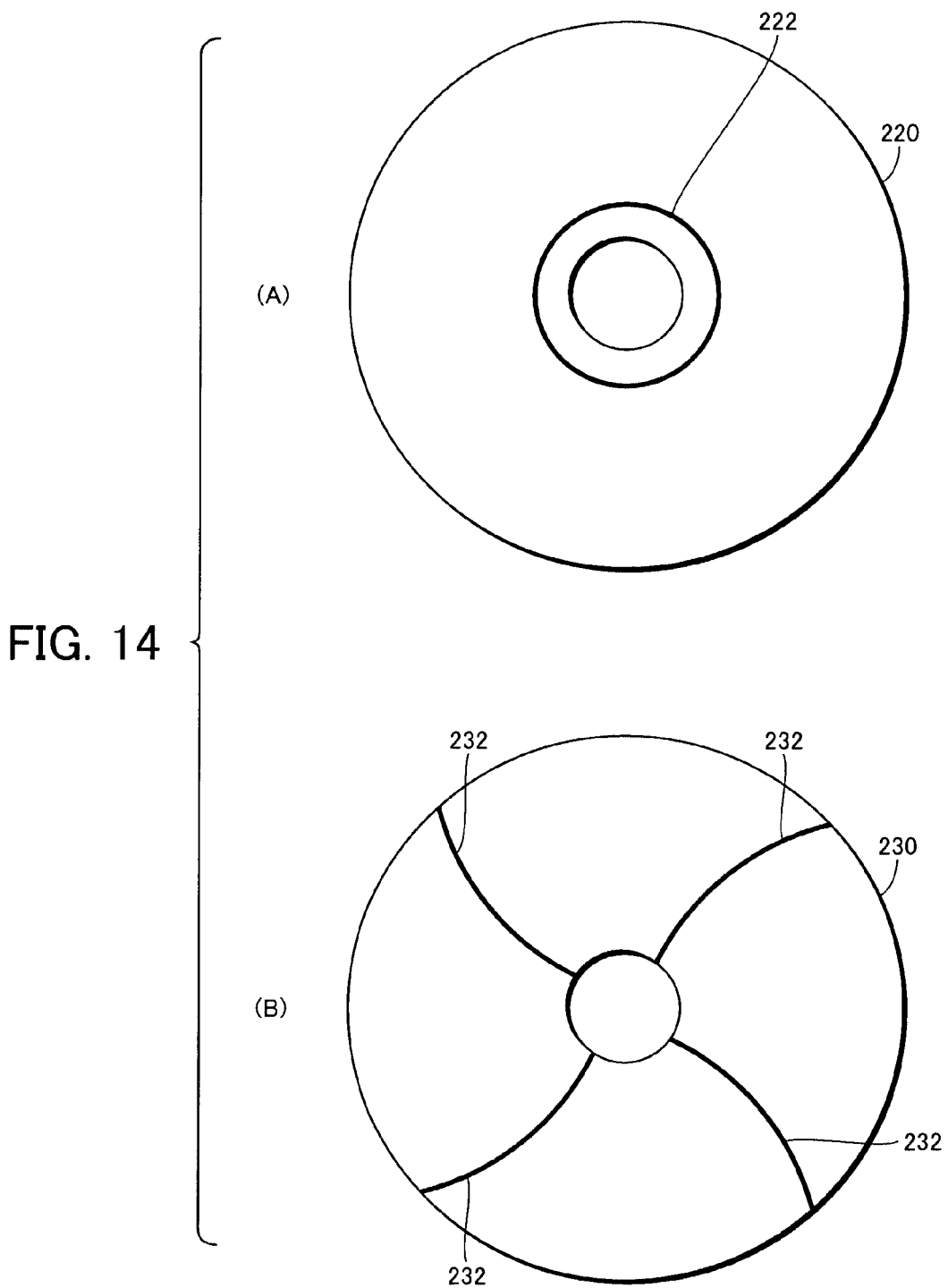
FIG. 14 shows a magnetic recording medium in which a test writing area is allocated in advance.

Referring to FIG. 14, a magnetic recording medium 220 shown in FIG. 14(A) is an example in which a test write area 222 is allocated as a ring of a certain radial width. A magnetic recording medium 230 shown in FIG. 14(B) is an example in which test write areas 232 are allocated extending in the radial direction. Magnetic recording medium 230 has a plurality of test write areas 232 and the test write can be executed in the same manner in any of the areas. Further, test write areas 222 and 232 are areas ensured for the test write, and the user data are not recorded. The area ensured for the test write includes an area in which magnetically isolated magnetic recording cells are arranged as in the user data area, and within the test write area or at a position preceding the test write area (in the circumferential direction), a signal pattern serving as a trigger for the test write is formed.

In this manner, by allocating the area for the test write to the magnetic recording medium in advance, failure of test writing due to insufficient free space of the magnetic recording medium can be prevented. In the area for the test write ensured in advance, the test write program can be executed and the optimal delay time can be calculated and, therefore, a magnetic recording apparatus enabling reduction of errors at the time of writing to the magnetic recording medium and errors at the time of reproduction can be provided.

The manner of allocating the area for test write is not limited to the examples shown in FIG. 14. The area for test write may be provided for each sector of a magnetic recording medium, or it may be provided for every area formed of a plurality of sectors. The area may be provided track by track. By such settings of the area, it becomes possible to set the timing of magnetic field generation optimal for each sector, each area or each track.

Setting of the timing of magnetic field generation (delay time) appropriate for each track is particularly effective. As described in the first embodiment, when the radial position of the recording/reproducing head with respect to the magnetic recording medium is to be changed, the suspension is swung about that portion of the suspension which is fixed on the VCM. Therefore, there is generated a skew angle between the recording/reproducing head and the magnetic recording medium. Therefore, the position of magnetic writing element and magnetic reading element with respect to the magnetic recording medium differs at different radial position. In view of the foregoing, it is preferred to execute the test write for each radial area or each track and to set the appropriate timing (delay time) of generating the magnetic field.

Even when the test write area is not provided in the magnetic recording medium, it is preferred to set the timing of magnetic field generation suitable for each radial area or each track, by executing the test write. By such an approach, it becomes possible to record at the timing (delay time) of magnetic field generation appropriate for each track, in accordance with the change in the skew angle of the recording/reproducing head.

When the test write area is provided on the magnetic recording medium as described above, it is possible for the magnetic recording apparatus to recognize where the test write area is, by providing, for example, an address pattern. Further, by providing a pattern indicating presence of the test write area preceding the test write area, it becomes possible to identify the test write area. Such an approach prevents erroneous writing to the test write area, when the user data is to be written. At the time of reading, using the address pattern or the pattern indicating presence of test write area, reading from the test write area can be avoided.

When the test write is done in the test write area, it is preferred to erase the information recorded in the test write, after the detection (reproduction) by the magnetic reading element. Since the unnecessary information after the test write is erased, influence of the unnecessary information after the test write can be prevented when the information recorded on the user data area is reproduced. Further, other than erasing the information recorded in the test write, address information of the area in which the test write is done of the magnetic recording medium may be obtained by the magnetic recording apparatus, and the information that the corresponding area allows overwriting by the user data may be stored. By such an approach, it becomes possible to use the test write area, which has been used for the test write program, for recording user data. Thus, a magnetic recording apparatus enabling recording of larger amount of data on the magnetic recording medium can be provided.

Second Embodiment

In the second embodiment, a magnetic recording evaluating apparatus, allowing detachable attachment of a magnetic recording medium and a suspension to the apparatus, for executing the test write program described above on a combination of a magnetic recording medium and a suspension (including a magnetic writing element and a magnetic reading element) set on the apparatus and for calculating the optimal delay time, will be described.

—Configuration—

Figure 17:
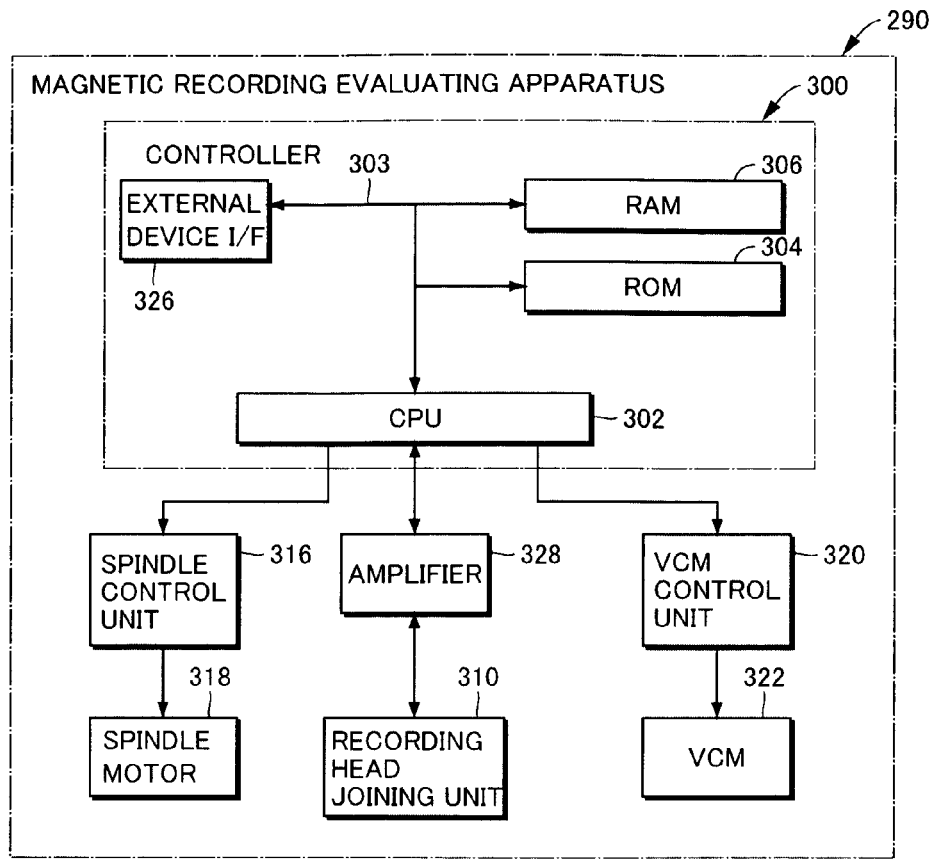
FIG. 17 is a block diagram showing a configuration of a magnetic recording evaluating apparatus in accordance with a second embodiment of the present invention.

Referring to FIG. 17, a magnetic recording evaluating apparatus 290 includes: a controller 300 controlling an operation of magnetic recording evaluating apparatus 290; a spindle motor 318 driving a spindle rotating a disk-shaped magnetic recording medium; a spindle control unit 316 controlling an operation of spindle motor 318 in accordance with the control by controller 300; a recording/reproducing head joining unit 310 provided at a tip end of a suspension, not shown, for connection to a recording/reproducing head for reading/writing magnetic information to/from the magnetic recording medium; a VCM 322 driving the suspension such that the recording/reproducing head moves in the radial direction of the magnetic recording medium mounted on the spindle; an amplifier 328 connected to controller 300 and recording/reproducing head joining unit 310, for adjusting a signal level between controller 300 and the recording/reproducing head connected to recording/reproducing head joining unit 310 to an appropriate level; and a VCM control unit 320 connected to controller 300 and VCM 322 for driving VCM 322 in accordance with the control by controller 300. The recording/reproducing head connected to recording/reproducing head joining unit 310 includes a magnetic writing element for applying a magnetic field to the magnetic recording medium and thereby recording information, and a magnetic reading element reading information recorded on the magnetic recording medium and outputting the information as an electric signal (both not shown).

Controller 300 includes: a CPU 302 substantially implemented by a processor connected to the magnetic writing element and the magnetic reading element, and controlling overall operation of magnetic recording evaluating apparatus 290 by executing a prescribed program code; a bus 303 connected to CPU 302; and an ROM 304 for recording program code and the like to be executed by CPU 302, an RAM 306 used as a temporary storage when CPU 302 executes the program code, and an external device interface 326 providing connection to an external terminal, all connected to bus 303.

ROM 304 and RAM 306 store pieces of information related to various settings such as strength, pulse width and generation timing of magnetic field generated by magnetic writing element, associated with magnetic writing element and magnetic reading element connected to the recording/reproducing head. ROM 304 and RAM 306 further store pieces of information related to settings such as signal amplitude for magnetic reading element to distinguish a track to be followed, signal amplitude for distinguishing an area, arrangement information, and a table representing correspondence between the signal amplitude and the amount of movement in the radial direction of recording/reproducing head.

Figure 18:
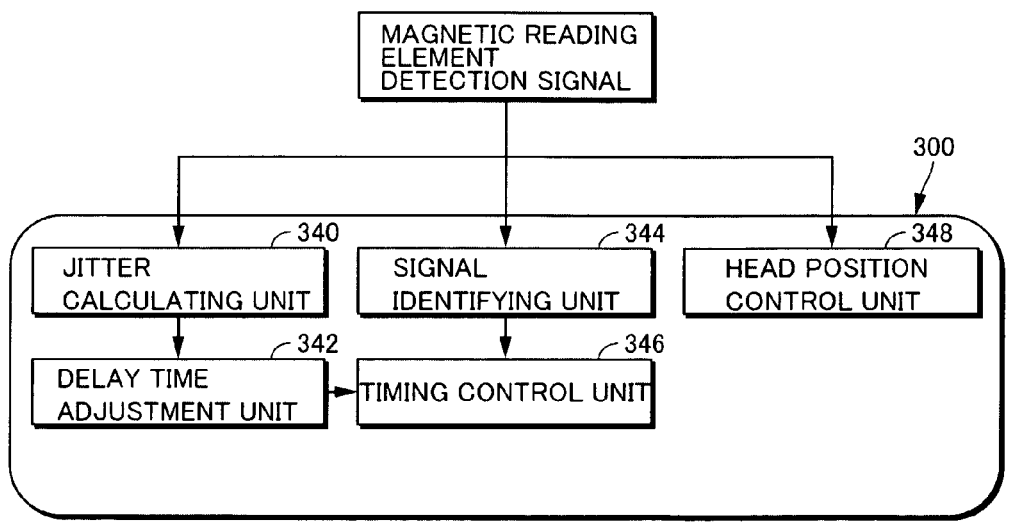
FIG. 18 is a block diagram showing a functional configuration for controlling a recording/reproducing head 366 realized by a CPU 302 executing a prescribed program.

Referring to FIG. 18, the functional block realized by cooperation of hardware and software when controller 300 executes a prescribed program includes: a jitter calculating unit 340 for calculating, for every delay time, jitter value of the reproduced signal of test data, when test write is done by writing test data to the magnetic recording medium using various different delay times, at the time of adjustment of delay time; a delay time adjustment unit 342, receiving the jitter value calculated for each delay time by jitter calculating unit 340, and adjusting and optimizing the delay time to decrease the jitter value; a signal identifying unit 344 for identifying a reference timing as a reference of the timing for generating magnetic field, based on a signal detected by the magnetic reading element at the time of operation; a timing control unit 346, reading the delay time adjusted by delay time adjustment unit 342, and causing the magnetic writing element to generate a magnetic field at a timing delayed from the reference timing detected by signal identifying unit 344 by the delay time read from delay time adjustment unit 342; and a head position control unit 348, calculating position information of the recording/reproducing head from the detection signal of magnetic reading element, transmitting a movement instruction to VCM control unit 320 and thereby controlling the radial position of recording/reproducing head with respect to the magnetic recording medium.

Head position control unit 348 realizes tracking control for recording and reproduction following a prescribed track, by feedback-radial position control. Specifically, head position control unit 98 detects a servo pattern recorded on a recording medium from signal waveform of a detection signal from magnetic reading element 54, determines off-track direction and off-track amount by looking up arrangement information and identifying information of the servo pattern, and controls the head position accordingly.

Figure 19:
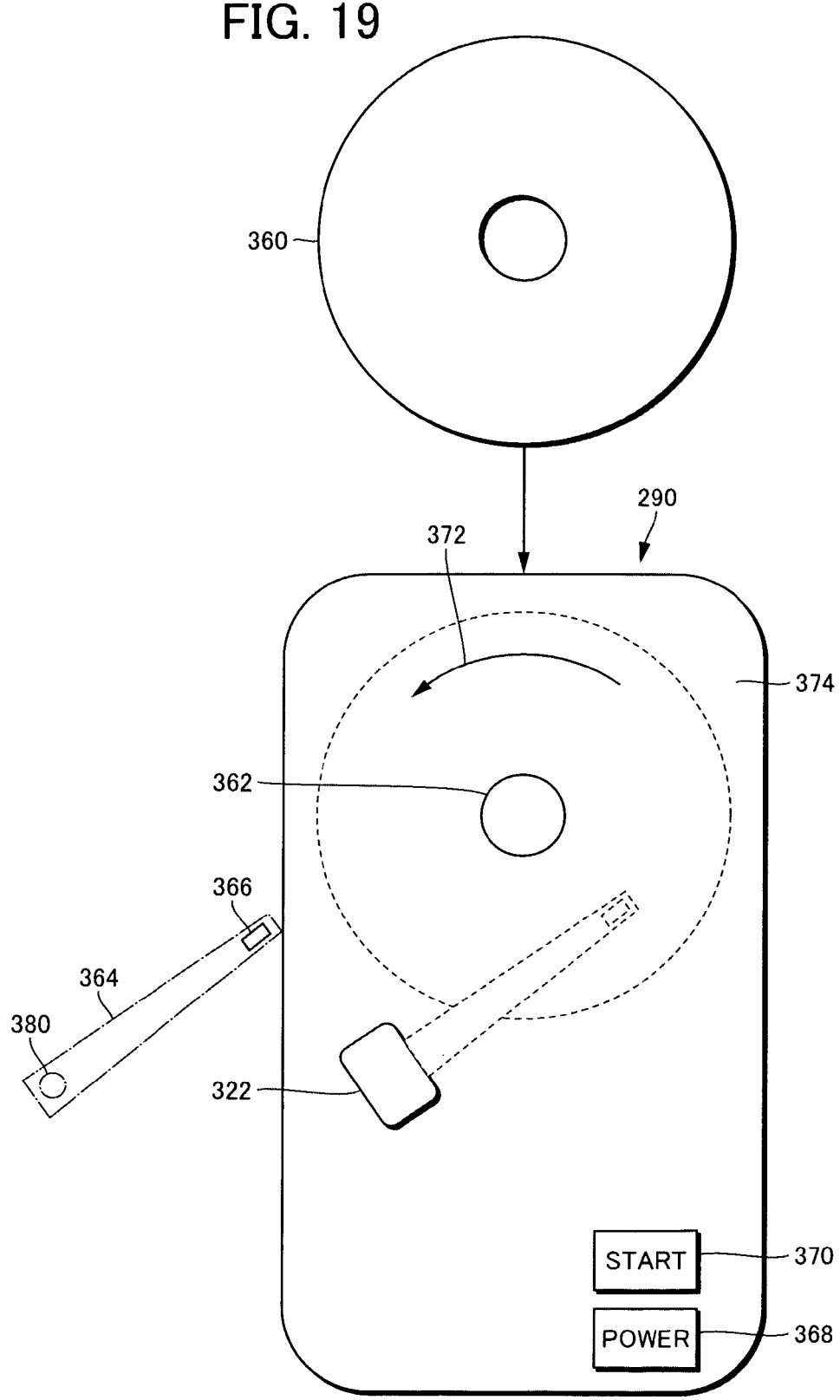
FIG. 19 shows a schematic configuration of a magnetic recording evaluating apparatus 290.

Referring to FIG. 19, magnetic recording evaluating apparatus 290 further includes: a spindle 362, on which a magnetic recording medium as the object of measurement is mounted, driven by spindle motor 318, for rotating the magnetic recording medium; a power button 368 for turning on the power of magnetic recording evaluating apparatus 290; a start button 370 instructing the start of execution of the test write program on magnetic recording medium 360 as the test object; and a dustproof cover 374 for preventing entrance of foreign matter to the evaluating apparatus.

In the present embodiment, magnetic recording medium 360 as a patterned media to be measured has a disk shape, and has a hole formed at the center, to which spindle 362 is fit. When fit in magnetic recording medium 360, spindle 362 rotates magnetic recording medium 360 in the direction of an arrow 372.

To magnetic recording evaluating apparatus 290, a suspension 340 detachable to VCM 322 (see FIG. 17) is connected. Suspension 364 has a recording/reproducing head 366 on a lower surface of an end opposite to the end connected to VCM 322. When connected to VCM 322, suspension 364 is driven to rotate about the connected one end, with the other end movable in the radial direction of magnetic recording medium 360 as the object of measurement. Since recording/reproducing head 366 is provided at the tip end of suspension 364, recording/reproducing head 366 can change its position in the radial direction of magnetic recording medium 360 in accordance with the operation of VCM 322. Further, suspension 364 includes a signal input/output unit 380 on the side connected to VCM 322, for enabling exchange of signals between recording/reproducing head 366 and controller 300. Signal input/output unit 380 is connected to recording/reproducing head joining unit 310 when suspension 364 is set to VCM 322. Thus, when suspension 364 is connected to magnetic recording evaluating apparatus 290, the operation of recording/reproducing head is controlled by controller 300.

When the test write program is executed by magnetic recording evaluating apparatus 290, the apparatus is powered on, and magnetic recording medium 360 as the object of measurement is set on spindle 362. After setting magnetic recording medium 360, suspension 364 is set to VCM 322, and start button 370 is pressed. Then, the test write program is executed.

Figure 20:
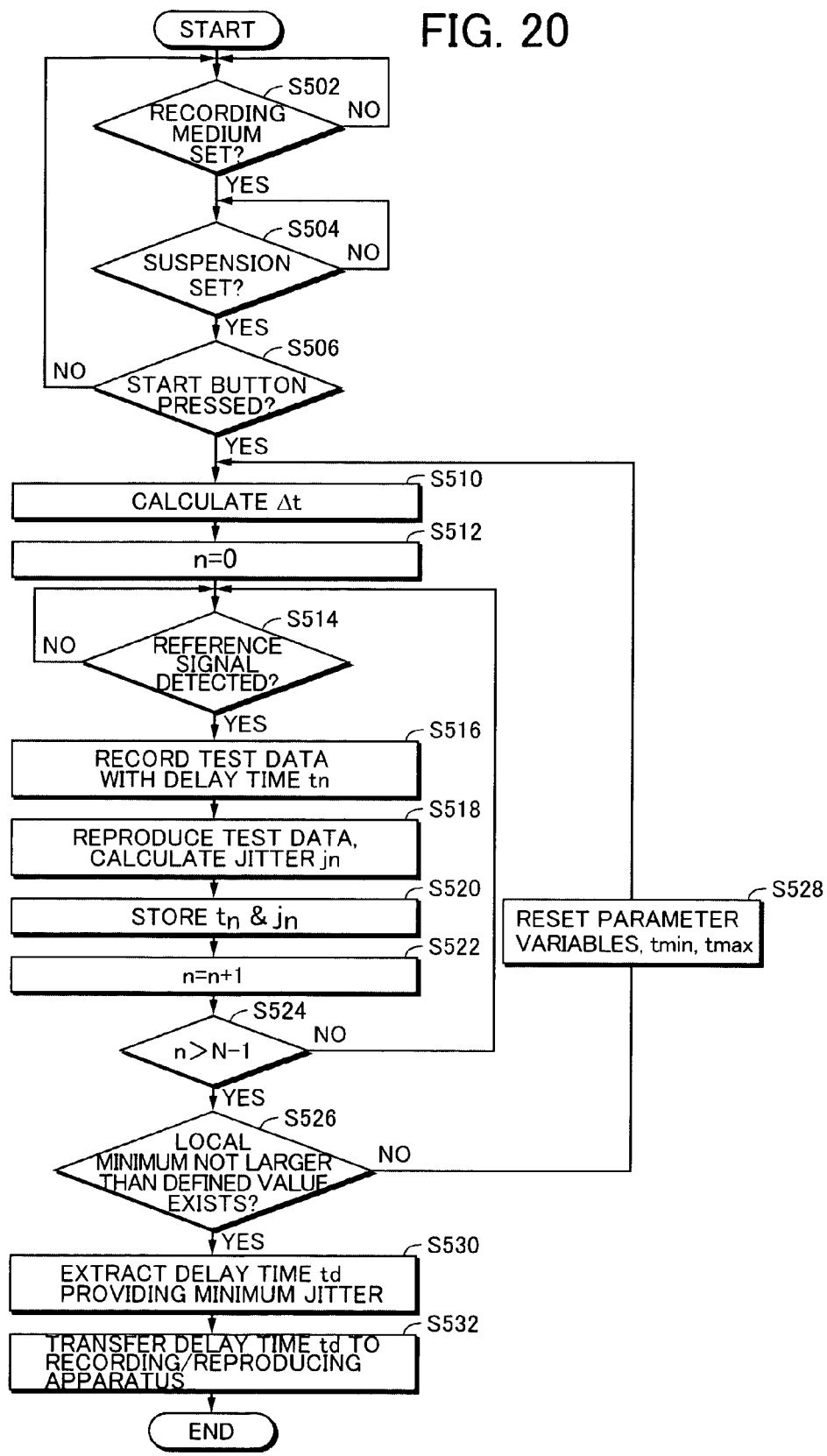
FIG. 20 is a flowchart representing a control structure of a test write program in magnetic recording evaluating apparatus 290, executed by CPU 302 of magnetic recording evaluating apparatus 290.

The test write program shown in FIG. 20 is a program for calculating the optimal delay time at the time of recording of magnetic recording medium 360 as the object of measurement. It is assumed that parameter variables (minimum value $t_{min}$ and maximum value $t_{max}$ of initially set delay time, the number N of repeating test write, jitter defined value $j_b$ and the like) and a reference signal are stored in advance in the program.

Referring to FIG. 20, the program is activated at the time of power on of magnetic recording evaluating apparatus 290, and it includes: a step S502 of determining whether or not magnetic recording medium 360 as the object of measurement is set on spindle 362, and branching the control flow depending on the result of determination; a step 504, executed if it is determined at S502 that the magnetic recording medium is set (YES), of determining whether or not suspension 364 is set on VCM 322, and branching the control flow depending on the result of determination; a step S506, executed if it is determined at S504 that suspension 364 is set (YES), of determining whether or not start button 370 is pressed, and branching the control flow depending on the result of determination; and a step S510 of calculating the step value Δt of delay time from the parameter variables.

The step value Δt calculated at S510 is calculated as Δt = $(t_{max}-t_{min})/(N-1)$. The step value Δt is used for changing the delay time stepwise in the test write process. Using the step value Δt, it is possible to represent the delay time $t_n$ (n=0 to N−1) as $t_0 = t_{min}$, $t_1 = t_{min}+\Delta t$, ... $t_n = t_{min}+n\cdot\Delta t$, ... $t_{N-2} = t_{min}+(N-2)\cdot\Delta t$, $t_{N-1} = t_{min}+(N-1)\cdot\Delta t = t_{max}$.

The program further includes a step S512, executed following S510, of setting 0 to variable n; a step S514, executed following S512, of determining whether or not the magnetic reading element has detected the reference signal, and branching the control flow depending on the result of determination; a step S516, executed if it is determined at S514 that the reference signal has been detected (YES), of recording test data in magnetic recording medium 360 as the object of measurement, with the delay time $t_n$ corresponding to the variable n, using the magnetic writing element; a step S518, executed following S516, of reproducing the test data recorded at S516 by the magnetic reading element, and calculating jitter value $j_n$ as a value representing signal quality; a step S520, executed following S518, of recording the jitter value $j_n$ corresponding to the delay time $t_n$; a step S522, executed following S520, of setting the value n+1 to variable n; a step S524, executed following S522, of determining whether or not the variable n satisfies the condition n>N−1, and branching the control flow depending on the result of determination; a step S526, executed if it is determined at S524 that the condition is satisfied (YES), of determining whether or not the jitter value $j_n$ has a local minimum not higher than a predetermined jitter defined value $j_b$, in the recorded relation between the delay time $t_n$ and the jitter value $j_n$, and branching the control flow depending on the result of determination; a step S528, executed if it is determined at S526 that there is no local minimum (NO), of resetting the minimum value $t_{min}$ and the maximum value $t_{max}$ of the delay time range and returning the control to S510; a step S530, executed if it is determined at S526 that there is a local minimum (YES), of extracting the delay time $t_d$ at which the jitter value becomes the smallest; and a step S532, executed following S530, of setting $t_d$ to be the optimal delay time, and transferring the optimal delay time $t_d$ to a recording/reproducing apparatus connected through external device interface 326.

If it is determined at S502 that the recording medium is not set (NO), the control returns to S502. If it is determined at S504 that suspension 364 is not set (NO), the control returns to S504. If it is determined at S506 that start button 370 is not pressed (NO), the control returns to S502. If it is determined at S514 that the reference signal is not detected (NO), the control returns to S514, and waits until the reference signal is detected. If it is determined at S524 that the condition is not satisfied (NO), the control returns to S514. After execution of S532, the program ends.

The jitter value $j_n$ calculated at S518 represents deviation in time of the reproduced signal from the clock signal and, similar to the error rate used in the first embodiment, the smaller jitter value represents better signal quality.

Figure 21:
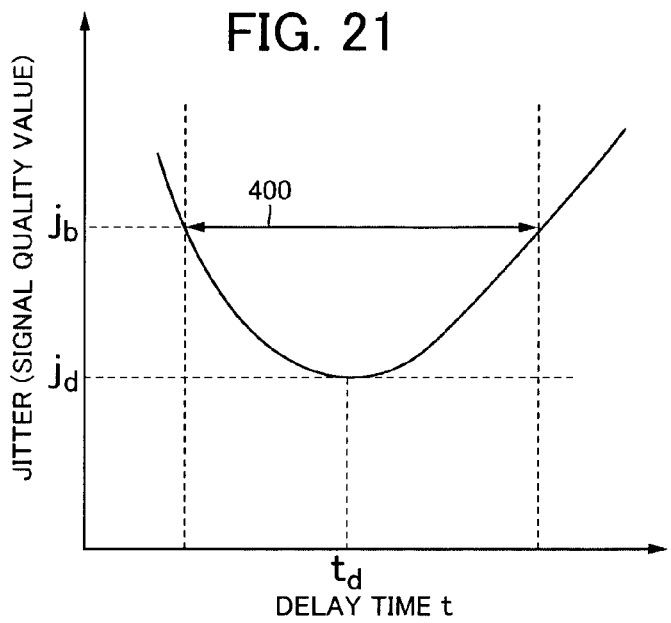
FIG. 21 represents a relation between the delay time and jitter recorded at S520 of the program shown in FIG. 20.

FIG. 21 shows a relation between the delay time and the jitter value recorded at S520 of the program shown in FIG. 20.

Referring to FIG. 21, the range represented by an arrow 400 is the range of delay time t in which the jitter value does not exceed the preset jitter defined value $j_b$, and the range of delay time in which the jitter value does not exceed the jitter defined value $j_b$ as represented by arrow 400 will be referred to as a "margin (tolerance)" of delay time.

In the program shown in FIG. 20, the local minimum at S526 represents the minimum value in the range in which the curve plotted by the jitter value in the measured range of delay time is convex downward, when there is such a relation between the delay time and the jitter value as shown in FIG. 21.

The delay $t_d$ extracted at S530 is, referring to FIG. 21, the delay time $t_d$ with which the jitter value assumes the minimum value $j_d$, which is not higher than the defined jitter value $j_b$.

At S528, if parameter variables $t_{min}$ and $t_{max}$ are to be reset, the minimum value $t_{min}$ and the maximum value $t_{max}$ of delay time are reset such that the range of delay time to be measured becomes larger, that is, to increase the value of $|t_{max}-t_{min}|$.

—Operation—

Magnetic recording evaluating apparatus 290 in accordance with the second embodiment operates in the following manner.

Magnetic recording evaluating apparatus 290 is connected to a separate magnetic recording apparatus through external device interface 326. The magnetic recording apparatus connected here has a configuration similar to that described in the first embodiment. Magnetic recording evaluating apparatus 290 conducts measurement using the same magnetic recording medium as a patterned medium and the same suspension including the magnetic writing element and the magnetic reading element, as those used in the connected magnetic recording apparatus, calculates the optimal delay time at the time of recording on the magnetic recording medium, and transfers the calculated result to the magnetic recording apparatus.

The magnetic recording medium measured in the second embodiment is the magnetic recording medium fabricated based on the schematic configuration and the manufacturing method described in the first embodiment. The methods of recording and reproduction of the magnetic recording medium by magnetic recording evaluating apparatus 290 are the same as in magnetic recording apparatus 30 described in the first embodiment and, therefore, description thereof will not be repeated.

When the power is turned on, magnetic recording evaluating apparatus 290 waits until magnetic recording medium 360 as the object of measurement is set by the user (S502). After magnetic recording medium 360 is set, suspension 364 is set (S504), and when start button 370 is pressed (YES at S506), magnetic recording evaluating apparatus 290 calculates the step value Δt of delay time from the parameter variables (S510). Thereafter, in magnetic recording evaluating apparatus 290, 0 is input to variable n (S512), and whether or not the magnetic reading element has detected the reference signal from magnetic recording medium 360 is determined (S514). If the reference signal is detected (YES at S514), magnetic field is generated at a timing of delay time $t_0=t_{min}$, and predetermined test data is recorded on magnetic recording medium 360 (S516). After recording the test data with delay time $t_0$, the test data is reproduced by the magnetic reading element, jitter value $j_0$ at delay time $t_0$ is calculated by jitter calculating unit 340 (S518), and the values $t_0$ and $j_0$ are recorded (S520). Thereafter, n+1 is input to variable n (S522), and whether or not the variable n satisfies the condition n>N−1 is determined (S524). If the variable n attains to 1 at S522 and if the number of repetition N of test write is 100, the condition at S524 is not satisfied (NO), and the control returns to S514. Thereafter, the process steps of S514 to S520 are performed with n=1, the jitter value $j_1$ with the delay time $t_1=t_0+1\cdot\Delta t$ is calculated and the result is recorded. Then, n+1 is input to variable n. Thereafter, process steps from S514 to S522 are repeated until the variable n satisfies the condition n>N−1. When n=N−1=99, the test data is recorded on magnetic recording medium 360 with the delay time $t_{99}=t_{min}+99\cdot\Delta t=t_{max}$, jitter value $j_{99}$ is calculated from the reproduced result, and the values $t_{99}$ and $j_{99}$ are recorded. At S522, n=100 is input to variable n. As a result, the condition of S524 is satisfied, and the control proceeds to S526.

At S526, determination is made as to whether or not the curve formed by the recorded value $j_n$ (n=0 to 99) with respect to $t_n$ is downward convex and has a local minimum of defined value $j_b$ or smaller. If it is determined that the local minimum is absent (NO at S526), values $t_{min}$ and $t_{max}$ are reset such that the range of delay time, that is, the value of $t_{max}-t_{min}$, becomes larger (S528). Then, control returns to S510, and again the jitter value $j_n$ with respect to $t_n$ is calculated. If it is determined that there is a local minimum (YES at S516), the delay time with which the jitter value assumes the local minimum, that is, the smallest value of the jitter value that is downward convex in the delay time range of measurement, is extracted as the optimal delay time $t_d$ (S530), and the information of optimal delay time $t_d$ is transferred to the connected magnetic recording apparatus (S532). After the information is transferred, the test write program ends.

Receiving the information of optimal delay time $t_d$ from magnetic recording evaluating apparatus 290, the magnetic recording apparatus stores the information of optimal delay time in setting information storage unit 48. When data is to be recorded on a magnetic recording medium, the magnetic recording apparatus reads the magnetic recording medium using the magnetic reading element to detect the reference signal. When the magnetic reading element detects the reference signal, the magnetic writing element is caused to generate a magnetic field at a timing delayed by the optimal delay time $t_d$ from the detection of reference signal, thereby to record data on the magnetic recording medium.

As described above, in magnetic recording evaluating apparatus 290 in accordance with the second embodiment, the test write program is executed on magnetic recording medium 360 as an object of measurement, in which the delay time from detection of a reference signal as a reference from the magnetic recording medium until recording of data to the magnetic recording medium is set and test data is written to the recording medium, the written data is read by the magnetic reading element, and the jitter value corresponding to the delay time is calculated and recorded. Such a series of operations is repeated within a set range of delay time, and a point at which the jitter value assumes the local minimum not higher than a predefined jitter defined value is detected. The delay time corresponding to the local minimum is extracted, and the delay time is set as the optimal delay time. Thereafter, the information of optimal delay time is transmitted to the connected external magnetic recording apparatus.

In this manner, on a magnetic recording medium as the object of measurement, test data is recorded while actually changing the delay time, and by checking the signal quality corresponding to each delay time, the optimal delay time is set. Therefore, it is possible to measure the magnetic field generation timing, which is of critical importance in the magnetic recording medium using a patterned medium as a recording medium. Further, in the magnetic recording evaluating apparatus in accordance with the second embodiment, it is possible to exchange magnetic recording media as the object of measurement and to measure the optimal delay time for each one of the recording media. As a result, a magnetic recording evaluating apparatus capable of setting optimal delay time in accordance with individual difference among recording media, for reducing recording and reproduction errors in a magnetic recording apparatus using patterned media as recording media, can be provided.

The magnetic recording apparatus receiving the information of optimal delay time information from the magnetic recording evaluating apparatus executes magnetic recording applying the data. When the information of optimal delay time is measured using the magnetic recording evaluating apparatus and the information is applied in a separate magnetic recording apparatus, the trouble of executing the test write program in each and every recording apparatus can be saved, if magnetic recording apparatuses are mass-produced under the same conditions. Further, it becomes possible to use the area used for the test write program as the area for storing user data, and hence, larger amount of information can be recorded on a magnetic recording medium.

Though the extracted optimal delay time is transferred to and used by an external magnetic recording apparatus in the present embodiment, the information of calculated optimal delay time may be written to the magnetic recording medium itself. In that case, even when the magnetic recording apparatus is not connected to the magnetic recording evaluating apparatus, the optimal delay time at the time of recording of the magnetic recording medium can be read and applied when the recording medium is loaded.

Further, in the magnetic recording evaluating apparatus in accordance with the second embodiment, the time when the jitter value assumes the minimum value not higher than the jitter defined value is used as the optimal delay time. However, any delay time corresponding to the jitter value not higher than the defined value may be set as the optimal value. By such an approach, the data may be recorded with the jitter not exceeding the defined value. Further, the center value of the time range in which the jitter does not exceed the defined value may be set as the optimal delay time. As a result, even if an error occurs in the delay time at the time of data recording, the jitter value can be kept at the defined value or lower.

Further, in magnetic recording evaluating apparatus 290, the delay time may be determined by using the error rate as in the first embodiment, in place of the jitter value. In that case, magnetic recording evaluating apparatus 290 includes an error rate calculating unit for calculating the error rate from the signals detected by the magnetic reading element, detects a reference signal from the magnetic recording medium, and the standby time period (delay time) until the magnetic writing element starts generation of magnetic field is adjusted. By adjusting the standby time period, it becomes possible to start generation of magnetic field when the magnetic writing element and the magnetic recording cell are at such a positional relation that makes the error rate smaller, and hence, recording and reproduction errors can be reduced. Specifically, it is possible to know at which position with respect to the recording cells the generation of magnetic field should be started to make recording error less likely. Therefore, by calculating the corresponding delay time and by recording with the delay time, recording and reproduction errors can be reduced.

Further, the time at which the error rate calculated from the detected signal attains the minimum value may be set as the optimal delay time. By such an approach, it becomes possible to generate magnetic field under the condition that makes the error rate the smallest. Further, the center value of the time range in which the error rate does not exceed the defined value may be set as the optimal delay time. As a result, even if an error occurs in the delay time at the time of data recording, the error rate can be highly likely kept at the defined value or lower.

The method of determining the delay time is not limited to those described above. By way of example, the amplitude of the signal detected by the magnetic reading element and the SAM in PRML detection may be used as values representing the signal quality.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A magnetic recording apparatus, comprising:
   a magnetic recording medium having a recording surface on which a plurality of magnetic recording cells magnetically isolated from each other are arranged;
   a magnetic writing element generating magnetic field in accordance with write information under a condition in accordance with prescribed setting information while moving relative to said recording surface, thereby to record information in said magnetic recording cells of said magnetic recording medium;
   a magnetic reading element reproducing information recorded in said magnetic recording cells of said magnetic recording medium while moving with said magnetic writing element relative to said recording surface;
   a first memory storing said prescribed setting information for writing of information by said magnetic writing element; and
   a processor connected to said first memory, said magnetic writing element, and said magnetic reading element, for executing a program code; wherein
   said program code includes
      a test module, responsive to a test write start signal, for repeating writing and reproduction of test information by said magnetic writing element and said magnetic reading element and calculating a prescribed quality index value representing quality of writing of reproduced said test information with said prescribed setting information changed,
      a first write module for selecting setting information with which said prescribed quality index value satisfies a predetermined condition based on said prescribed quality index value calculated by said test module, and writing the selected information in said first memory, and
      a determining module for determining whether or not an output signal of said magnetic reading element matches a prescribed signal serving as a trigger of writing by said magnetic element;

said prescribed setting information includes a standby time period from determination by said determining module that said output signal matches said prescribed signal until generation of magnetic field by said magnetic writing element; and said test module includes
- a standby time period changing module, responsive to said test write start signal for changing stepwise said standby time period for a predetermined prescribed range of change having upper and lower limits,
- a second write module causing said magnetic writing element to star generation of magnetism in accordance with said test information and thereby to write the test information in said magnetic recording medium, for each standby time period changed by said standby time period changing module, using as a reference time point when the standby time period has passed from when said prescribed signal is output from said magnetic reading element,
- a read module causing said magnetic reading element to reproduce the test information written by said second write module to said magnetic recording medium, for each standby time period changed by said standby time period changing module,
- an index value calculating module for calculating a quality index value by comparing the test information written by said second write module and the test information reproduced by said magnetic reading element, for each standby time period changed by said standby time period changing module,
- a quality information memory storing said quality index value calculated by said index value calculating module and corresponding standby time period, and
- a writing device for storing, in said first memory, the standby time period stored in said quality information memory in association with that one of said quality index values stored in the quality information memory which satisfies said predetermined condition.

2. The magnetic recording apparatus according to claim 1, wherein
said predetermined condition is that said quality value index value is the best.

3. The magnetic recording apparatus according to claim 2, wherein
said magnetic recording medium has a disk-shape;
said magnetic recording cells are arranged on said recording surface, with a pitch d in circumferential direction of said disk shape; and
with design velocity of relative movement of said recording surface to said magnetic writing element and said magnetic reading element being liner velocity v,
width of said prescribed range of change is selected to be larger than d/v.

4. The magnetic recording apparatus according to claim 1, wherein said index value calculating module includes an error rate calculating module for calculating error rate of the read test information to said written test information, by comparing the test information written by said second write module and the test information read by said read module, for each standby time period changed by said standby time period changing module.

5. The magnetic recording apparatus according to claim 1, wherein said index value calculating module includes a jitter calculating module for calculating jitter of a read signal, by comparing a signal waveform reproduced and output by said read module with a prescribed reference signal, for each standby time period changed by said standby time period changing module.

6. The magnetic recording apparatus according to claim 5, wherein said predetermined condition is that said quality index value is not higher than a predetermined defined value.

7. The magnetic recording apparatus according to claim 5, wherein
said predetermined condition is that
said quality index value is a value corresponding to said standby period of $(t_b + t_a)/2$, where
$t_a$ represents said delay time when said quality index value, calculated corresponding to changed said standby time period, first assumes a value not larger than a predetermined defined value, from a value larger than said defined value, while said standby time period changing module changes stepwise said delay time from said lower limit to said upper limit of said prescribed range of change, and
$t_b$ represents said delay time, larger than $t_a$, when said quality index value first assumes a value not smaller than said defined value, from a value smaller than said defined value.

8. The magnetic recording apparatus according to claim 7, wherein
said magnetic recording medium has a disk-shape;
said magnetic recording cells are arranged on said recording surface, with a pitch d in circumferential direction of said disk shape; and
with design velocity of relative movement of said recording surface to said magnetic writing element and said magnetic reading element being liner velocity v,
width of said prescribed range of change is selected to be larger than 2 d/v.

9. The magnetic recording apparatus according to claim 1, wherein said magnetic recording medium includes a servo pattern area having a prescribed servo pattern written in advance, and a user data area allowing data writing by said magnetic writing element.

10. The magnetic recording apparatus according to claim 9, wherein
said magnetic recording medium has a disk-shape;
said magnetic writing element and said magnetic reading element are arranged spaced by a distance L in the circumferential direction of said disk shape; and
with design velocity of relative movement of said recording surface to said magnetic writing element and said magnetic reading element being liner velocity v,
said lower limit value is selected to be larger than L/v.

11. The magnetic recording apparatus according to claim 1, wherein said magnetic recording medium includes a user data area allowing data writing by said magnetic writing element, and said user data area stores information for said magnetic reading element to output said prescribed signal serving as a trigger for writing by said magnetic writing element.

12. The magnetic recording apparatus according to claim 1, further comprising a timer for measuring elapse time from when said standby time period selected by said first write module is stored in said first memory and, when a prescribed set time is reached, generating and applying to said processor said test write start signal.

13. The magnetic recording apparatus according to claim 1, further comprising
a recording state value calculating module for calculating a recording state value indicating quality of information writing by said magnetic writing element in a normal operation other than when said processor is operating; wherein
said processor is activated in responses to said recording state value calculated by said recording state value calculating module attaining to a prescribed reference value or lower.

14. The magnetic recording apparatus according to claim 1, wherein said magnetic recording medium includes a test write area ensured in advance as an area to be used when said processor operates, and an area allowing writing of information by said magnetic writing element other than when said processor is operating.

15. A magnetic recording apparatus, comprising:
a magnetic recording medium having a recording surface on which a plurality of magnetic recording cells magnetically isolated from each other are arranged;
a magnetic writing element generating magnetic field in accordance with write information under a condition in accordance with prescribed setting information while moving relative to said recording surface, thereby to record information in said magnetic recording cells of said magnetic recording medium;
a magnetic reading element reproducing information recorded in said magnetic recording cells of said magnetic recording medium while moving with said magnetic writing element relative to said recording surface;
a first memory storing said prescribed setting information for writing of information by said magnetic writing element; and
a processor connected to said first memory, said magnetic writing element, and said magnetic reading element, for executing a program code; wherein
said program code includes
a test module, responsive to a test write start signal, for repeating writing and reproduction of test information by said magnetic writing element and said magnetic reading element and calculating a prescribed quality index value representing quality of writing of reproduced said test information with said prescribed setting information changed, and
a first write module for selecting setting information with which said prescribed quality index value satisfies a predetermined condition based on said prescribed quality index value calculated by said test module, and writing the selected information in said first memory, and
said prescribed setting information includes one of or both of pulse width of generated magnetic field and maximum value of generated magnetic field.

16. The magnetic recording apparatus according to claim 15, further comprising:
a recording state value calculating module for calculating a recording state value indicating quality of information writing by said magnetic writing element in a normal operation other than when said processor is operating; wherein
said processor is activated in response to said recording state value calculated by said recording state value calculating module attaining to a prescribed reference value or lower.

17. The magnetic recording apparatus according to claim 15, wherein said magnetic recording medium includes a test write area ensured in advance as an area to be used when said processor operates, and an area allowing writing of information by said magnetic writing element other than when said processor is operating.

18. A magnetic recording apparatus, comprising:
a magnetic recording medium having a recording surface on which a plurality of magnetic recording cells magnetically isolated from each other are arranged;
a magnetic writing element generating magnetic field in accordance with write information under a condition in accordance with prescribed setting information while moving relative to said recording surface, thereby to record information in said magnetic recording cells of said magnetic recording medium;
a magnetic reading element reproducing information recorded in said magnetic recording cells of said magnetic recording medium while moving with said magnetic writing element relative to said recording surface;
a first memory storing said prescribed setting information for writing of information by said magnetic writing element; and
a processor connected to said first memory, said magnetic writing element, and said magnetic reading element, for executing a pro ram code; wherein
said program code includes
a test module, responsive to a test write start signal, for repeating writing and reproduction of test information by said magnetic writing element and said magnetic reading element and calculating a prescribed quality index value representing quality of writing of reproduced said test information with said prescribed setting information changed, and
a first write module for selecting setting information with which said prescribed quality index value satisfies a predetermined condition based on said prescribed quality index value calculated by said test module, and writing the selected information in said first memory, and
said magnetic recording cells are arranged on said recording surface, with a pitch d in circumferential direction of said disk shape;
said magnetic writing element and said magnetic reading element are arranged spaced by a distance L in the circumferential direction of said disk shape; and
with a maximum value of skew angle of said magnetic recording head to said medium when said magnetic recording head moved in the radial direction being $\Theta$, $L(1-\cos \Theta) > d/10$.

19. The magnetic recording apparatus according to claim 18, further comprising:
a recording state value calculating module for calculating a recording state value indicating quality of information writing by said magnetic writing element in a normal operation other than when said processor is operating; wherein
said processor is activated in response to said recording state value calculated by said recording state value calculating module attaining to a prescribed reference value or lower.

20. The magnetic recording apparatus according to claim 18, wherein said magnetic recording medium includes a test write area ensured in advance as an area to be used when said processor operates, and an area allowing writing of information by said magnetic writing element other than when said processor is operating.

* * * * *